United States Patent
Guo et al.

(10) Patent No.: US 10,812,720 B2
(45) Date of Patent: Oct. 20, 2020

(54) IMAGE STABILIZATION FOR ELECTRONIC DEVICES SUCH AS CAMERAS

(71) Applicant: Samsung Electronics Co., Ltd., Suwon-si, Gyeonggi-do (KR)

(72) Inventors: Kai Guo, Suwon-si (KR); Seung-won Choi, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/516,850

(22) Filed: Jul. 19, 2019

(65) Prior Publication Data

US 2020/0120282 A1    Apr. 16, 2020

(30) Foreign Application Priority Data

Oct. 10, 2018  (KR) .................. 10-2018-0120592

(51) Int. Cl.
*H04N 5/232*    (2006.01)

(52) U.S. Cl.
CPC ..... *H04N 5/23267* (2013.01); *H04N 5/23258* (2013.01)

(58) Field of Classification Search
CPC .................................................. H04N 5/23267
USPC ....................................................... 348/208.1
See application file for complete search history.

(56) References Cited

U.S. PATENT DOCUMENTS

| | | |
|---|---|---|
| 8,736,690 B2 | 5/2014 | Imanishi |
| 9,071,756 B2 | 6/2015 | Karpenko |
| 9,357,129 B1 | 5/2016 | Grundmann et al. |
| 9,374,532 B2 | 6/2016 | Grundmann et al. |
| 9,413,962 B2 | 8/2016 | Tsubaki |
| 9,479,700 B1 | 10/2016 | Crawford et al. |
| 9,554,043 B2 | 1/2017 | Grundmann et al. |
| 9,635,256 B2 | 4/2017 | Owen et al. |

(Continued)

FOREIGN PATENT DOCUMENTS

KR    10-2018-0078576 A    7/2018

OTHER PUBLICATIONS

A. Karpenko et al., "Digital Video Stabilization and Rolling Shutter Correction using Gyroscopes", Tech Rep. CSTR/2011-03, Stanford University Computer Science, Dec. 1, 2011.

(Continued)

*Primary Examiner* — Joel W Fosselman
(74) *Attorney, Agent, or Firm* — Harness, Dickey & Pierce, P.L.C.

(57) ABSTRACT

An electronic device includes an image sensor configured to receive light that is incident on the electronic device through a lens and generate image data, a gyroscope configured to generate rotation motion data of the electronic device, and an image stabilizer configured to generate translation motion data of the electronic device based on the image data received from the image sensor and to generate a stabilized image by compensating for a motion of the electronic device while capturing the image, such as vibration of a handheld device. The stabilized image is generated based on filtered translation motion data obtained by performing a first filtering operation on the translation motion data and filtered rotation motion data obtained by performing a second filtering operation on the rotation motion data received from the gyroscope.

20 Claims, 17 Drawing Sheets

(56) References Cited

U.S. PATENT DOCUMENTS 9,692,972 B2 6/2017 Karpenko
2010/0053343 A1* 3/2010 Kim .................. H04N 5/23248
  348/208.4

OTHER PUBLICATIONS

M. Grundmann et al., "Auto-directed Video Stabilization with Robust L1 Optimal Camera Paths.", Proceedings of the 2011 IEEE Conference on Computer Vision and Pattern Recognition, Jun. 20, 2011, pp. 225-232.

* cited by examiner

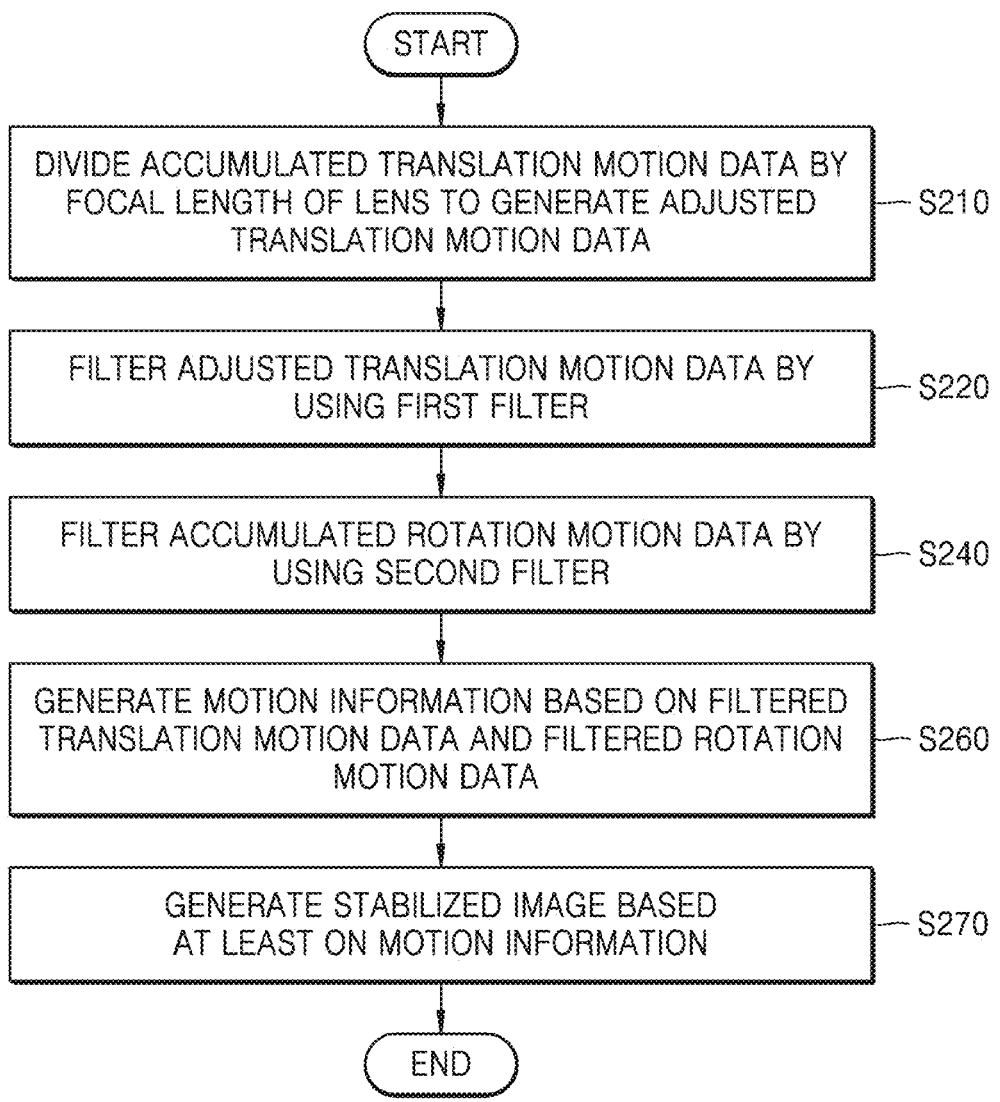

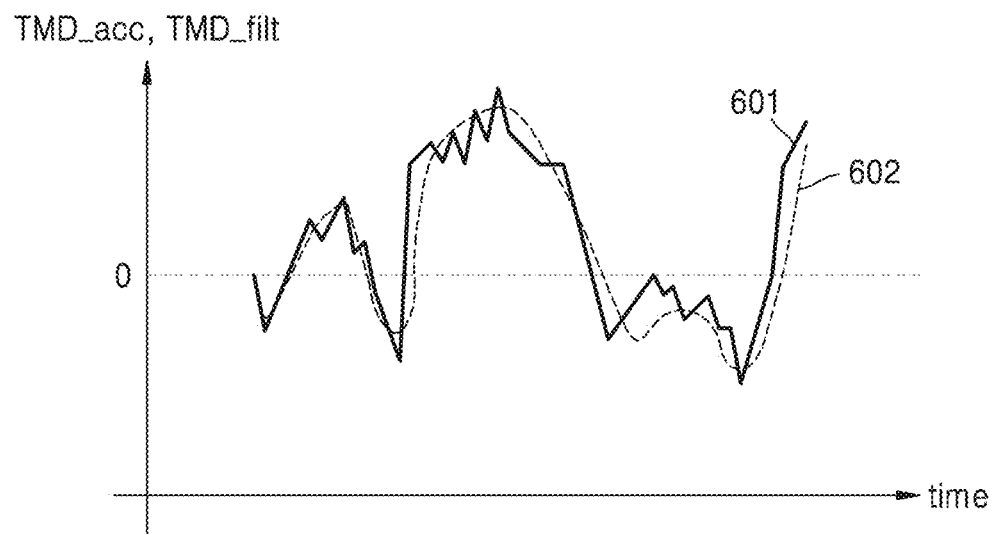

IMAGE STABILIZATION FOR ELECTRONIC DEVICES SUCH AS CAMERAS

CROSS-REFERENCE TO RELATED APPLICATION

This application claims the benefit of Korean Patent Application No. 10-2018-0120592, filed on Oct. 10, 2018, in the Korean Intellectual Property Office, the disclosure of which is incorporated herein in its entirety by reference.

BACKGROUND

Portable electronic devices such as smartphones, tablet personal computers (PCs), and smartwatches exhibit various functions have been expanded recently. Cameras may be included in portable electronic devices such as smartphones and tablet PCs, with which users may capture an image with a portable electronic device in daily life. In a case where a user photographs or records still images and/or video of an external object using a handheld electronic device, vibration of the user's hand may reduce the quality of a generated image. For electronic devices equipped with cameras that are capable of high magnification and/or high resolution, it may be difficult to obtain a sharp image due to manual vibration.

SUMMARY

According to an example embodiment, an electronic device may include an image sensor configured to receive light transmitted through a lens and to generate image data; a gyroscope configured to generate rotation motion data of the electronic device; and an image stabilizer configured to generate translation motion data of the electronic device based on the image data received from the image sensor, perform a first filtering operation on the translation motion data to generate filtered translation motion data, perform a second filtering operation on the rotation motion data received from the gyroscope to generate filtered rotation motion data, and generate a stabilized image based at least on the filtered translation motion data and the filtered rotation motion data, wherein generating the stabilized image compensates for motion of the electronic device while capturing an image.

According to an example embodiment, a camera may include a lens, a gyroscope configured to generate rotation motion data, an image sensor configured to generate image data from light transmitted through the lens, and an image stabilizer configured to generate translation motion data based on the image data received from the image sensor, receive the rotation motion data from the gyroscope, perform a first filtering operation on the translation motion data to generate filtered translation motion data, perform a second filtering operation on the rotation motion data to generate filtered rotation motion data, and generate a stabilized image based at least on the filtered translation motion data and the filtered rotation motion data, wherein generating the stabilized image compensates for rotational and/or translational motion of the camera while capturing an image.

According to an example embodiment, an image stabilizing method of an electronic device including a lens may include receiving image data based on light transmitted through the lens, accumulating rotation motion data obtained by a gyroscope to generate accumulated rotation motion data, accumulating translation motion data based on the image data to generate accumulated translation motion data, filtering (using a first filter) the accumulated translation motion data to generate filtered translation motion data, filtering (using a second filter) the accumulated rotation motion data to generate filtered rotation motion data, and generating a stabilized image based at least on the filtered translation motion data and the filtered rotation motion data, wherein generating the stabilized image compensates for motion of the electronic device while capturing an image.

DESCRIPTION OF THE DRAWINGS

The example embodiments presented herein may be understood from the following detailed description taken in conjunction with the accompanying drawings in which:

FIG. 7 is a flowchart of a motion information generating method of an electronic device, according to an example embodiment;

FIG. 8A is a graph showing accumulated translation motion data and filtered translation motion data with respect to time, according to an example embodiment;

FIG. 8B is a diagram showing accumulated translation motion data according to an example embodiment;

DETAILED DESCRIPTION

Hereinafter, example embodiments will be described in detail with reference to the accompanying drawings.

Figure 1:
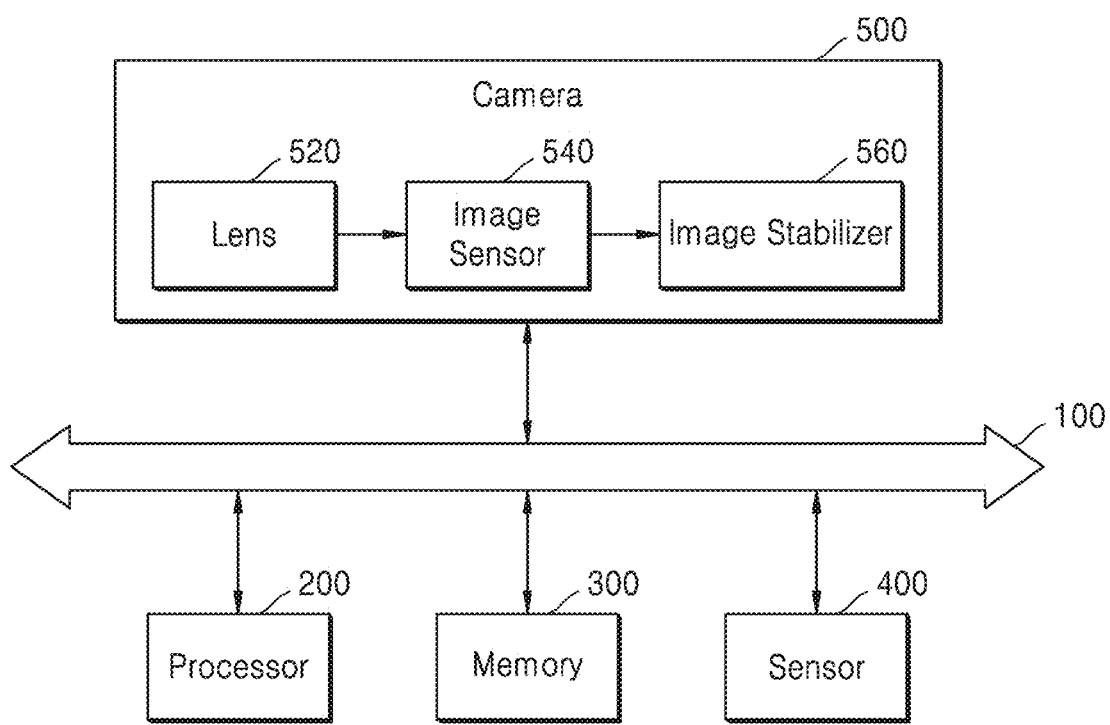
FIG. 1 is a diagram illustrating an electronic device according to an example embodiment.

FIG. 1 is a diagram illustrating an electronic device 10 configured according to some example embodiments presented herein. The electronic device 10 may include a bus 100, a processor 200, a memory 300, a sensor 400, and a camera 500. In some example embodiments, the electronic device 10 may include at least one of a smartphone, a tablet personal computer (PC), a mobile phone, an image or video phone, an e-book reader, a desktop PC, a laptop PC, a netbook PC, a workstation, a personal digital assistant (PDA), a portable multimedia player (PMP), an MP3 player, a mobile medical device, a camera, and a wearable device. Examples of the wearable device may include accessory wearable devices, such as electronic watches, electronic rings, electronic bracelets, electronic ankle bracelets, electronic necklaces, glasses, contact lenses, and head-mounted devices (HMDs), and bio-implantable wearable devices such as implantable circuits.

The bus 100 may denote a communication channel for communication among the elements included in the electronic device 10. FIG. 1 illustrates the electronic device 10 including one bus 100, but example embodiments are not limited thereto. In other example embodiments, the electronic device 10 may include a plurality of buses.

The processor 200 may control an overall operation of the electronic device 10. For example, the processor 200 may be a central processing unit (CPU). The processor 200 may include one processor core, or may include a plurality of processor cores (for example, a multicore). The processor 200 may process or execute programs and/or data stored in the memory 300. In an example embodiment, the processor 200 may execute the programs stored in the memory 300 to control a function of the electronic device 10.

The memory 300 may be a storage for storing data, and for example, may store an operating system (OS), various programs, and various pieces of data. The memory 300 may include at least one of a volatile memory and a non-volatile memory. The non-volatile memory may include read only memory (ROM), programmable read only memory (PROM), erasable programmable read only memory (EPROM), electrical erasable programmable read only memory (EEPROM), flash memory, phase-change random access memory (PRAM), magnetoresistive random access memory (MRAM), resistive random access memory (RRAM), and ferroelectric random access memory (FRAM). The volatile memory may include dynamic random access memory (DRAM), static random access memory (SRAM), and synchronous DRAM (SDRAM). The memory 300 may include at least one of hard disk drive (HDD), solid state drive (SSD), CompactFlash (CF), Secure Digital (SD), Micro Secure Digital (Micro-SD), Mini Secure Digital (Mini-SD), eXtreme Digital (xD), and Memory Stick. The memory 300 may permanently, semi-permanently, or temporarily store programs and instructions executed by the processor 200.

The sensor 400 may collect various pieces of information about a periphery of the electronic device 10. For example, the sensor 400 may include a gyroscope that is configured to obtain data about a rotation motion of the electronic device 10. Other examples of sensors 400 include an ultrasonic sensor, an infrared sensor, an acceleration sensor, and a gravity sensor. Also, the electronic device 10 may be included in the camera 500 or the sensor 400, based on an implementation type of the electronic device 10.

The camera 500 may generate image data of an object outside the electronic device 10. The image data may be used to produce a still image, such as a picture, or a sequence of images, such as a video. The camera 500 may perform at least one of various image processing on the image data. The camera 500 may include a lens 520 and an image sensor 540, and moreover, may include an image signal processor. The image signal processor may include an image stabilizer 560, but for convenience of description, FIG. 1 illustrates only an image stabilizer 560 among elements included in the image signal processor.

The lens 520 may collect light reflected by the object outside the electronic device 10. The lens 520 may provide the collected light to the image sensor 540.

The image sensor 540 may receive the light transmitted through the lens 520 and may generate image data. To this end, the image sensor 540 may include a pixel array where a plurality of pixels are two-dimensionally arranged. For example, one of a plurality of reference colors may be allocated to each of the plurality of pixels. For example, the plurality of reference colors may include red, green, and blue (RGB) or red, green, blue, and white (RGBW). In an example embodiment, the image sensor 540 may be implemented with a charge-coupled device (CCD) or a complementary metal oxide semiconductor (CMOS). The image data generated by the image sensor 540 may be referred to as an image frame or frame data. The image sensor 540 may generate image data to be presented as a still image, such as a photograph. The image sensor 540 may also generate a sequence of image data at time intervals, such as a video. The frequency at which the image sensor 540 produces image data, corresponding to a period where a new image is generated, may be referred to as a framerate. In other words, a framerate may represent the number of pieces of image data which are newly generated per unit time.

The image stabilizer 560 may perform image processing on the image data provided from the image sensor 540. For example, the image stabilizer 560 may obtain information about a motion of the electronic device 10 including the camera 500 to compensate for the motion of the electronic device 10 with respect to the image data. In an example embodiment, an operation of the image stabilizer 560 may be activated in a photographing mode, such as a moving image photographing mode, a time lapse photographing mode, or a panorama photographing mode of the electronic device 10, for obtaining pieces of image data.

In an example embodiment, the image stabilizer 560 may obtain translation motion data of the electronic device 10 by using the image data provided from the image sensor 540. The translation motion data may include first axis-direction translation motion data and second axis-direction translation motion data, and a translation motion of the electronic device 10 will be described below in more detail with reference to FIGS. 2A to 2C.

In an example embodiment, the image stabilizer 560 may receive rotation motion data of the electronic device 10 from the gyroscope included in the sensor 400. The rotation motion data may include first axis-direction rotation motion data, second axis-direction rotation motion data, and third axis-direction rotation motion data, and a rotation motion of the electronic device 10 will be described below in more detail with reference to FIGS. 2A to 2C.

In some example embodiments, an image stabilizer 560 may be configured to generate a stabilized image from image data, wherein generating the stabilized image compensates for translational motion and/or rotational motion. Analysis of rotational motion based on a sensor 400 such as a gyroscope 420 may include rotational motion due to handheld vibration of the camera, but analysis of the image data received from the image sensor 540, from which the translational motion is identified, may include both translational motion as well as rotational motion due to handheld vibration of the camera. If image stabilization is performed in which a rotational component of the motion of the electronic device affects both the determination of translational motion and the determination of rotational motion, the resulting compensation may be inaccurate. However, vibration of a handheld camera may result in rotational motion that is rapid and transient, while translational motion of the image may be incremental and progressive. In some example embodiments, image stabilization may distinguish between the rotational motion component due to handheld vibration and the translation motion component of the motion in order to apply the translational image compensation selectively to the translational motion and the rotational image compensation selectively to the rotational motion due to handheld vibration.

In some example embodiments, a high-pass filter may be applied to the rotational motion detected by the sensor 400 such as a gyroscope 420, producing a first motion determination that may be selective for rapid and transient rotational motion such as may result from vibration of a handheld device, and a low-pass filter may be applied to the translational motion detected through image analysis, producing a determination that may be selective for incremental and progressive translational motion. For example, an image stabilizer 560 may perform a first filtering operation on the obtained translation motion data to obtain filtered translation motion data. In an example embodiment, the image stabilizer 560 may accumulate translation motion data to obtain accumulated translation motion data and may divide the accumulated translation motion data by a focal length of the lens 520 to obtain adjusted translation motion data, and moreover, may perform the first filtering operation on the adjusted translation motion data to obtain filtered translation motion data. The image stabilizer 560 may perform a second filtering operation on the received rotation motion data to obtain filtered rotation motion data. The second filtering operation may be a filtering operation having a complementary relationship with the first filtering operation. In an example embodiment, the first filtering operation may be a low pass filtering operation, and the second filtering operation may be a high pass filtering operation. In an example embodiment, the low pass filtering operation may include a Gaussian low pass filtering operation and an infinite impulse (IIR) filtering operation, and the high pass filtering operation may include a Gaussian high pass filtering operation and a Butterworth filtering operation.

In an example embodiment, the image stabilizer 560 may generate motion information about the electronic device 10 based at least on the filtered translation motion data and the filtered rotation motion data. The image stabilizer 560 may use the generated motion information to generate the stabilized image. That is, the image stabilizer 560 may compensate for a motion of the electronic device 10 based on the motion information, in a manner that selectively compensates for rotational motion due to the handheld device and/or that selectively compensates for translational motion as distinguished from vibration-based rotational motion.

The image stabilizer 560 may be implemented as various types, and in some example embodiments, the image stabilizer 560 may be implemented as a hardware type or a software type. For example, when the image stabilizer 560 is implemented as a hardware type, the image stabilizer 560 may include a plurality of circuits that receive image data and perform image processing on the received image data. Also, for example, when the image stabilizer 560 is implemented as a software type, a separate processor (not shown) included in the processor 200 or the camera 500 may execute programs and/or instructions loaded into the memory 300, thereby performing an image processing operation. In other words, it may be described that the separate processor included in the processor 200 or the camera 500 executes programs included in the image stabilizer 560 to perform the above-described image processing operation. However, the present disclosure is not limited to the example embodiments, and the image stabilizer 560 may be implemented, like firmware, as a type where software is combined with hardware.

In an example embodiment, the electronic device 10 may perform the first filtering operation on translation motion data obtained from image data, perform the second filtering operation on rotation motion data obtained from the gyroscope, and generate omnidirectional motion information about the electronic device 10 based on the filtered data.

Figure 2A:
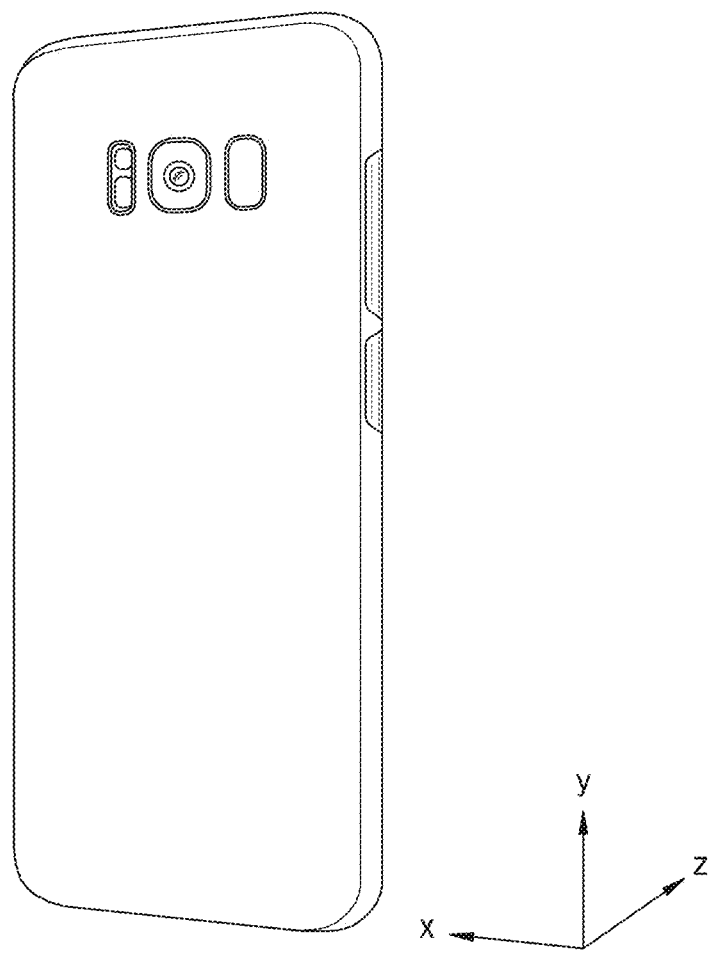
FIGS. 2A to 2C are diagrams illustrating an electronic device for describing a translation motion and a rotation motion of the electronic device.
Figure 2B:
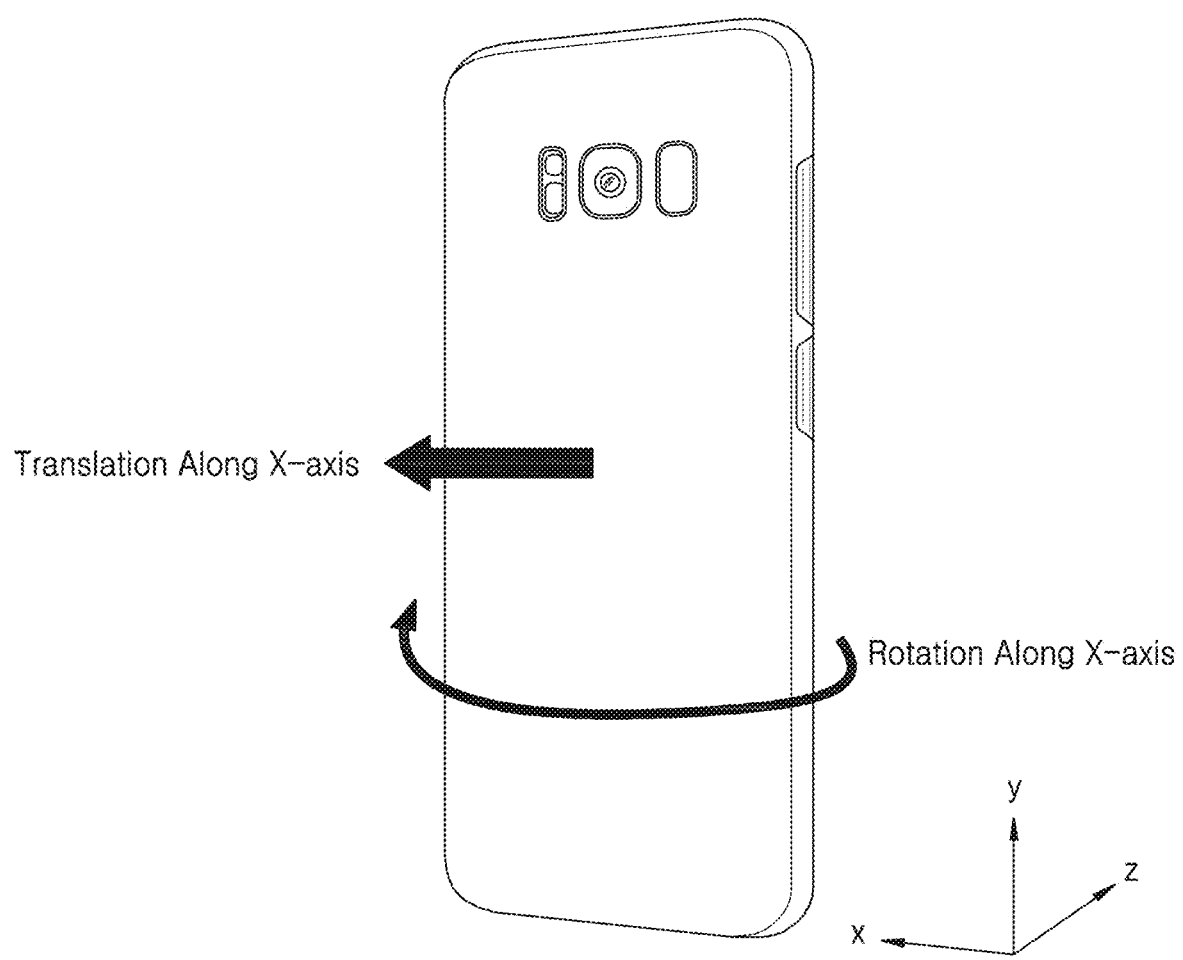
Figure 2C:
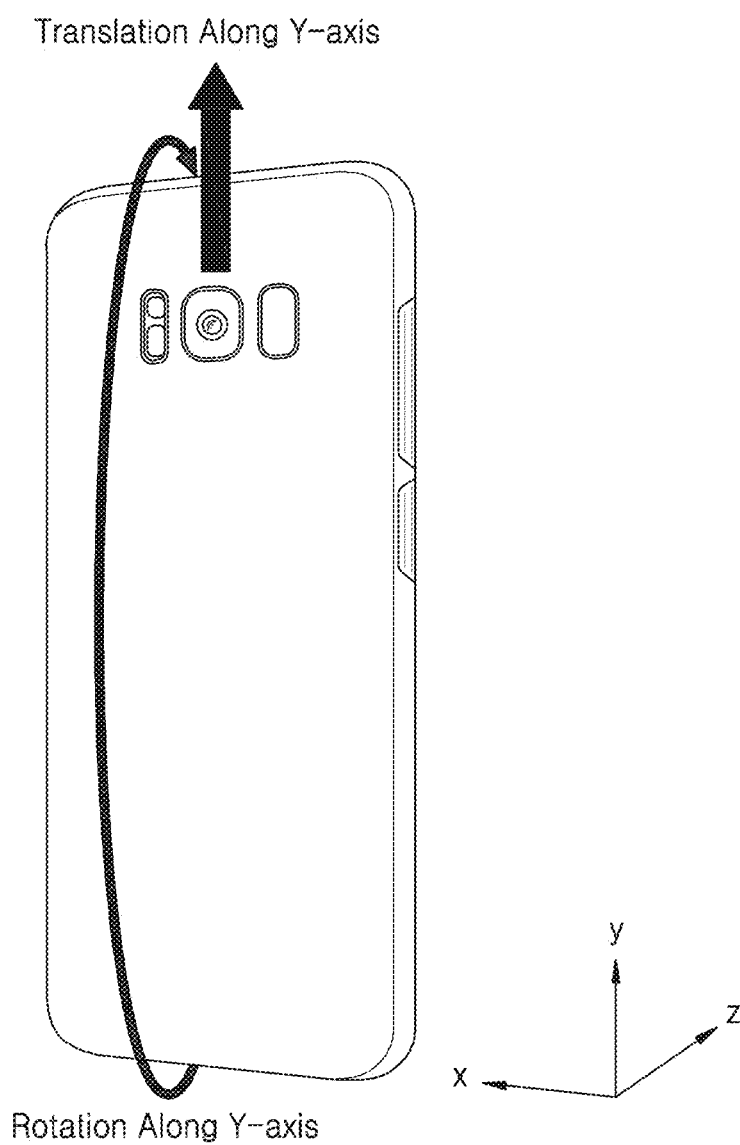

FIGS. 2A to 2C are diagrams illustrating an electronic device for describing a translation motion and a rotation motion of the electronic device. In FIGS. 2A to 2C, external features of the electronic device, such as a position and a size of a camera lens and a shape of the electronic device, are merely examples presented for convenience of description, and the present disclosure is not limited thereto.

Referring to FIG. 2A, a space where the electronic device is provided may be a three-dimensional (3D) space including a first axis direction, a second axis direction, and a third axis direction. Herein, for convenience of description, an axis of the first axis direction may be used as an x axis in the space, an axis of the second axis direction may be used as a y axis in the space, and an axis of the third axis direction may be used as a z axis in the space. Also, the x axis, the y axis, and the z axis may be defined so that a plane expressed through a combination of an x axis direction and a y axis direction is parallel to a plane on which a camera of the electronic device is located. In other words, a direction along the x axis may be parallel to a direction in which light is incident on the camera in a normal direction. The electronic device may be manipulated by a user (a photographer) of the electronic device, and in this case, the electronic device may unexpectedly move.

Referring to FIG. 2B, the electronic device may move in the x axis direction or may rotate in the x axis direction. An x axis-direction translation motion of the electronic device may represent a motion where a centroid of the electronic device moves in the x axis direction. An x axis-direction rotation motion of the electronic device may represent a motion where the electronic device rotates in the x axis direction with respect to the centroid of the electronic device. For convenience of description, a motion where the electronic device rotates in the x axis direction may be referred to as an x axis-direction rotation motion of the electronic device.

Referring to FIG. 2C, the electronic device may move in the y axis direction or may rotate in the y axis direction. A y axis-direction translation motion of the electronic device may represent a motion where a centroid of the electronic device moves in the y axis direction. A y axis-direction rotation motion of the electronic device may represent a motion where the electronic device rotates in the y axis direction with respect to the centroid of the electronic device. For convenience of description, a motion where the electronic device rotates in the y axis direction may be referred to as a y axis-direction rotation motion of the electronic device.

Although not shown in FIGS. 2B and 2C, the electronic device may rotate along the z axis. A motion where the electronic device rotates in the z axis direction with respect to the centroid of the electronic device may be referred to as a z axis-direction rotation motion of the electronic device.

Figure 3:
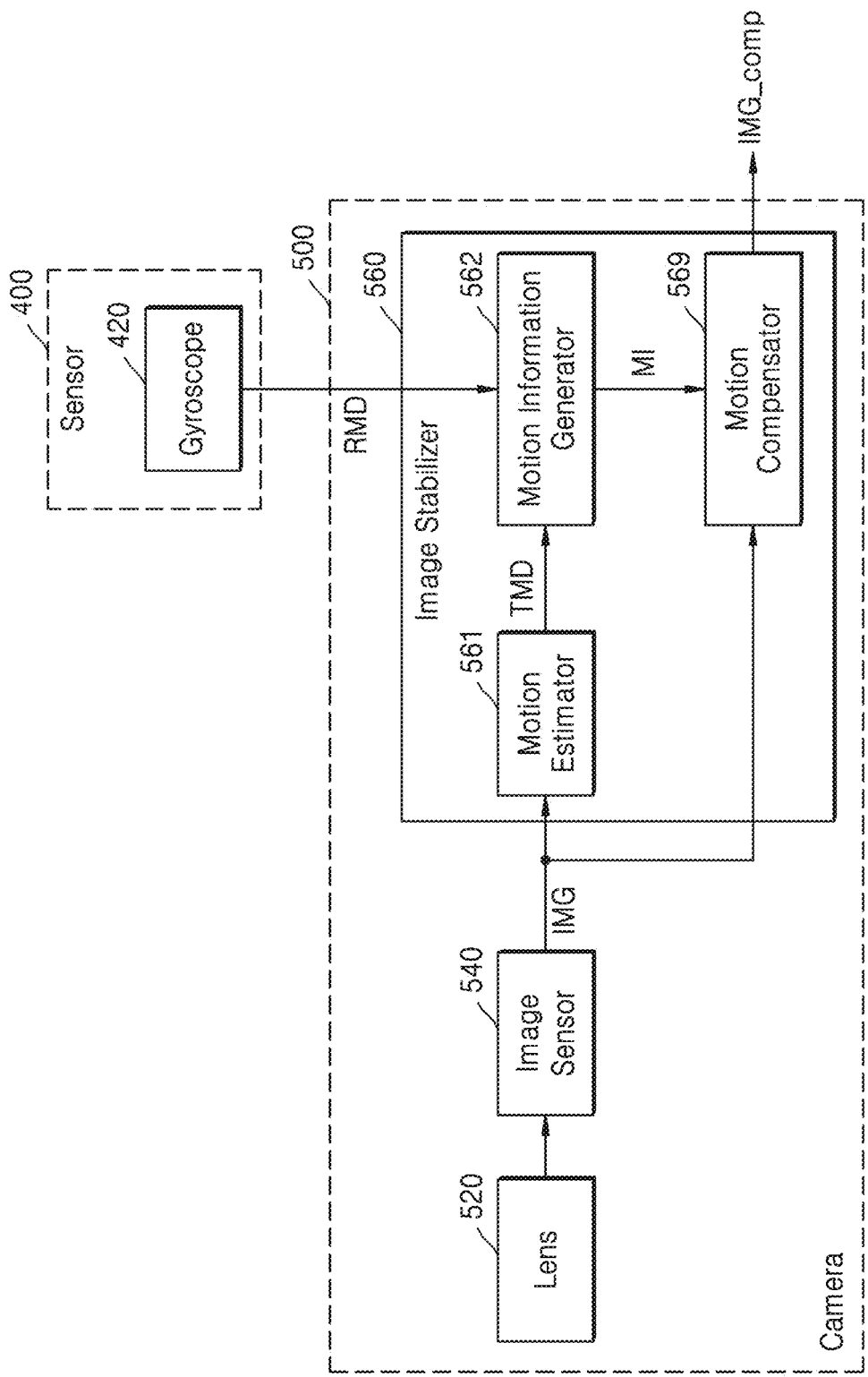
FIG. 3 is a diagram illustrating a sensor and a camera according to an example embodiment.

FIG. 3 is a diagram illustrating a sensor 400 and a camera 500 according to an example embodiment. In describing the sensor 400 and the camera 500 of FIG. 3, descriptions already given with reference to FIG. 1 are omitted. The sensor 400 and the camera 500 will be described with reference to FIG. 3 in conjunction with FIG. 1.

The sensor 400 may include a gyroscope 420. The gyroscope 420 may measure a rotation motion of the electronic device 10 including the gyroscope 420 by using the angular momentum principle. The gyroscope 420 may generate rotation motion data RMD including information about an angle at which the electronic device 10 performs a rotation motion with respect to a reference state. In an example embodiment, the rotation motion data RMD may include first axis-direction rotation motion data, second axis-direction rotation motion data, and third axis-direction rotation motion data.

The camera 500 may include a lens 520, an image sensor 540, and an image stabilizer 560. The image stabilizer 560 may include a motion estimator 561, a motion information generator 562, and a motion compensator 569.

In some example embodiments, each of the image stabilizer 560, motion estimator 561, motion generator 562, and/or motion compensator 569 may be implemented as processing circuitry, such as a general-purpose hardware processor (e.g., a CPU); a specialized hardware processor such as a graphics processor (GPU); and/or a virtual processor, such as a virtual machine that is implemented by an emulator and/or hypervisor. In some example embodiments, the image stabilizer 560, motion estimator 561, motion generator 562, and/or motion compensator 569 may be implemented as an application-specific integrated circuit (ASIC); a field-programmable gate array (FPGA); and/or a combination of discrete components such as transistors. In some example embodiments, the image stabilizer 560, motion estimator 561, motion generator 562, and/or motion compensator 569 may be implemented as software instructions that are stored in a volatile or nonvolatile memory, and that are executed by a processor and/or that are used to configure a hardware device such as an FPGA, wherein execution of the instructions causes the hardware device to implement an image stabilizer. Further, while the example embodiment of FIG. 3 depicts an image stabilizer 560 that includes the motion estimator 561, the motion generator 562, and the motion compensator 569, it is to be appreciated that the number, functionality, factoring, and/or interaction of the elements of the image stabilizer 560 may vary in accordance with the subject matter of the present disclosure.

The motion estimator 561 may generate translation motion data TMD of the electronic device 10, based on image data IMG received from the image sensor 540. In an example embodiment, the motion estimator 561 may generate the translation motion data TMD from pieces of image data IMG received at a plurality of viewpoints. In an example embodiment, the motion estimator 561 may obtain the translation motion data TMD, based on a translational motion of an object included in the image data IMG. The motion estimator 561 may provide the generated translation motion data TMD to the motion information generator 562.

The motion information generator 562 may receive the translation motion data TMD from the motion estimator 561 and may receive the rotation motion data RMD from the gyroscope 420. The motion information generator 562 may perform a first filtering operation on the translation motion data TMD, perform a second filtering operation on the rotation motion data RMD, and generate motion information MI based on the filtered translation motion data and the filtered rotation motion data. The motion information MI may represent information including a motion of the electronic device 10 based on a translation motion and a rotation motion of the electronic device 10.

In some example embodiments, the motion information generator 562 may accumulate translation motion data over a period of time, and may generate accumulated translation motion data. In an example embodiment, the motion information generator 562 may divide the accumulated translation motion data by a focal length of the lens 520 to generate adjusted translation motion data and perform the first filtering operation on the adjusted translation motion data to generate filtered translation motion data. In an example embodiment, the motion information generator 562 may accumulate rotation motion data with time to generate accumulated rotation motion data and may perform the second filtering operation on the accumulated rotation motion data to generate filtered rotation motion data.

In some example embodiments, the first filtering operation and the second filtering operation may represent a complementary filtering operation therebetween. In an example embodiment, the first filtering operation may be a low pass filtering operation, and the second filtering operation may be a band pass filtering operation.

The motion information generator 562 may provide the generated motion information MI to the motion compensator 569. The image stabilizer 560 may include a motion compensator 569 that compensates the image data IMG, based on the motion information MI provided from the motion information generator 562, thereby generating a compensated image IMG_comp. In other words, the motion compensator 569 may compensate for a motion of the electronic device 10 with respect to the image data IMG, based on the motion information MI, thereby generating the compensated image IMG_comp. Therefore, the image stabilizer 560 may output the compensated image data IMG_comp as an image that is sharper than the image data IMG. As a first example, if the movement information MI indicates translational motion to the left by a determined distance, the motion compensator 569 may compensate by shifting the image produced by the image sensor 540 to the right by the determined distance. As a second example, if the movement information MI indicates downward translational motion by a determined distance, the motion compensator 569 may compensate by shifting the image produced by the image sensor 540 upward by the determined distance. As a third example, if the movement information MI indicates clockwise rotational motion around a Z-axis by a determined angle, the motion compensator 569 may compensate by rotating the image produced by the image sensor 504 in an anticlockwise rotational motion by the determined angle. If the movement information MI indicates movement along multiple translational and/or rotational axes, the motion compensator 569 may compensate by applying multiple forms of shifting, rotating, and the like, corresponding to the movement along each axis.

The electronic device 10 according to an example embodiment may perform the first filtering operation on translation motion data obtained from image data, perform the second filtering operation on rotation motion data obtained from a gyroscope, and generate omnidirectional motion information about the electronic device 10 based on the filtered translation motion data and the filtered rotational motion data.

In an example embodiment, the image stabilizer 560 compensates for a motion of the electronic device 10 by sampling the translation in a relatively low-frequency band and sampling rotation in a relatively high-frequency band. Motion information MI for image compensation may be obtained by performing a complementary filtering operation on each of translation motion data and rotation motion data.

Figure 4:
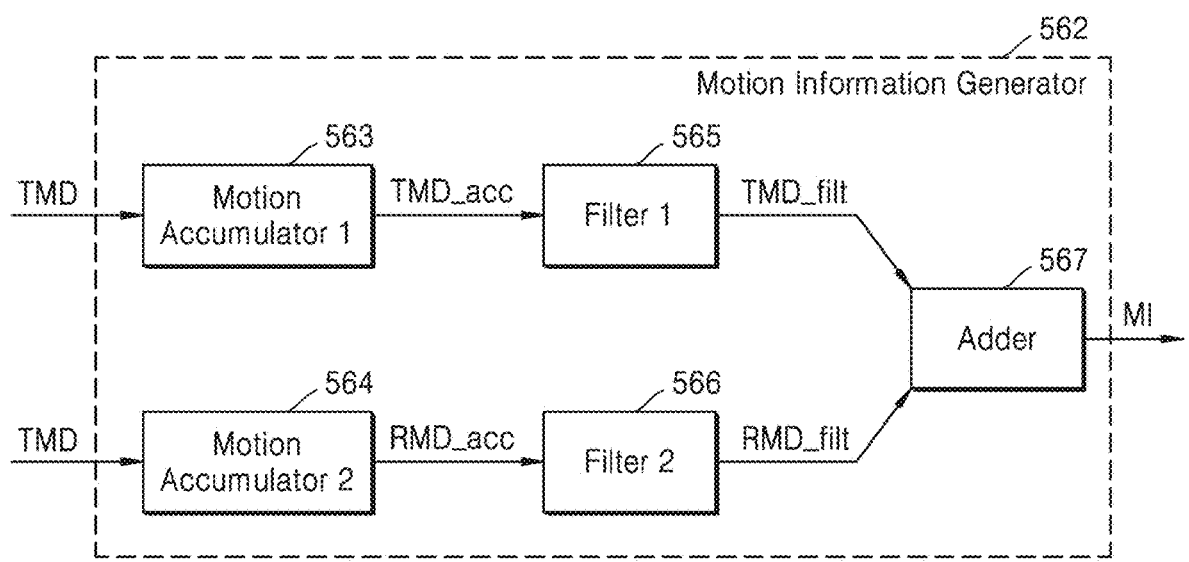
FIG. 4 is a diagram illustrating a motion information generator according to an example embodiment.

FIG. 4 is a diagram illustrating a motion information generator 562 according to an example embodiment. In describing the motion information generator 562, the previously presented description of FIG. 3 is omitted. The following description of the motion information generator 562 may be understood with reference to FIGS. 1, 3, and 4.

The motion information generator 562 may include a first motion accumulator 563, a second motion accumulator 564, a first filter 565, a second filter 566, and an adder 567.

The first motion accumulator 563 may accumulate translation motion data TMD to generate accumulated translation motion data TMD_acc. The translation motion data TMD and the accumulated translation motion data TMD_acc may represent translation along one axis-direction or along several axis-directions. The accumulated translation motion data TMD_acc may be data having a one-dimensional (1D) matrix form. The first motion accumulator 563 may add the translation motion data TMD to an $n^{th}$ element of the accumulated translation motion data TMD_acc to generate an $(n+1)^{th}$ element of the accumulated translation motion data TMD_acc. The accumulated translation motion data TMD_acc may be generated as expressed in the following Equation (1):

$$TMD\_acc\ [n+1] = TMD\_acc\ [n] + TMD \qquad (1)$$

A frequency at which data is newly accumulated to the accumulated translation motion data TMD_acc may be referred to as a frequency of accumulated translation motion data. In an example embodiment, the frequency of the accumulated translation motion data may be equal to or less than a framerate at which the image sensor 540 provides the image data IMG.

The second motion accumulator 564 may accumulate rotation motion data RMD to generate accumulated rotation motion data RMD_acc. The rotation motion data RMD and the accumulated rotation motion data RMD_acc may represent rotation of one axis-direction or of several axis-directions. The accumulated rotation motion data RMD_acc may be data having a 1D matrix form. The second motion accumulator 564 may add the rotation motion data RMD to an $m^{th}$ element of the accumulated rotation motion data RMD_acc to generate an $(m+1)^{th}$ element of the accumulated rotation motion data RMD_acc. The accumulated rotation motion data RMD_acc may be generated as expressed in the following Equation (2):

$$RMD\_acc\ [m+1] = RMD\_acc\ [m] + RMD \qquad (2)$$

The first filter 565 may perform a first filtering operation on the accumulated translation motion data TMD_acc to generate filtered translation motion data TMD_filt. The first filter 565 may be a low pass filter. In an example embodiment, the first filter 565 may be one of various low pass filters such as a Gaussian low pass filter and an IIR filter.

The second filter 566 may perform a second filtering operation on the accumulated rotation motion data RMD_acc to generate filtered rotation motion data RMD_filt. The second filter 566 may be a filter having a complementary relationship with the first filter 565. The second filter 566 may be a high pass filter. In an example embodiment, the second filter 566 may be one of various high pass filters such as a Gaussian high pass filter and a Butterworth filter. Also, in an example embodiment, the second filter 566 may be a high pass filter that is implemented with a low pass filter and a subtractor that subtracts the low-pass filtered data from the unfiltered data.

The adder 567 may generate the motion information MI based on the filtered translation motion data TMD_filt and the filtered rotation motion data RMD_filt. For example, the adder 567 may sum and/or average at least a portion of the filtered translation motion data TMD_filt and at least a portion of the filtered rotation motion data RMD_filt to generate the motion information MI. In an example embodiment, the filtered translation motion data TMD_filt may include filtered first axis-direction translation motion data and filtered second axis-direction translation motion data, and the filtered rotation motion data RMD_filt may include filtered first axis-direction rotation motion data, filtered second axis-direction rotation motion data, and filtered third axis-direction rotation motion data. In an example embodiment, the adder 567 may combine (e.g., summing and/or averaging) the filtered first axis-direction translation motion data and the filtered first axis-direction rotation motion data to generate first motion information, combine the filtered second axis-direction translation motion data and the filtered second axis-direction rotation motion data to generate second motion information, and generate the filtered third axis-direction translation motion data as third motion information. The adder 567 may output the first motion information, the second motion information, and the third motion information as the motion information MI.

Figure 5:
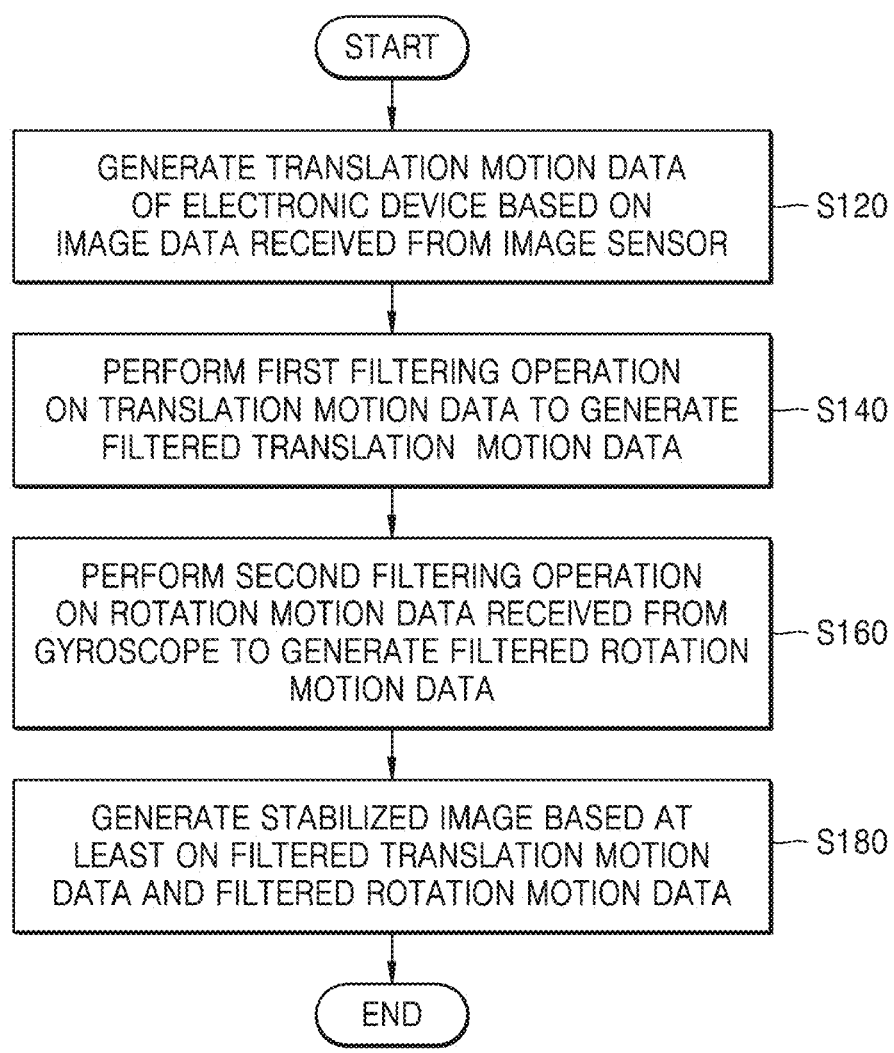
FIG. 5 is a flowchart of a motion information generating method of an electronic device, according to an example embodiment.

FIG. 5 is a flowchart of a motion information generating method of an electronic device according to an example embodiment. The motion information generating method will be described below with reference to FIG. 5 in conjunction with FIGS. 1, 3, and 4. The flowcharts presented and discussed herein, including FIG. 5, may depict a set of operations that are arranged in a certain order. However, it is to be appreciated that the arrangement of the operations may be only one example, and that operations may be added, removed, reordered, and/or performed concurrently in accordance with the subject matter of the present disclosure.

In operation S120, the electronic device 10 may generate translation motion data based on image data received from the image sensor. In an example embodiment, the translation motion data is obtained as accumulated translation motion data TMC_acc.

In operation S140, the electronic device 10 may perform a first filtering of the translation motion data (such as the accumulated translation motion data TMD_acc) to generate filtered translation motion data. In an example embodiment, the first filtering may involve applying a first filter 565 included in the motion information generator 562 to the accumulated translation motion data TMD_acc to generate the filtered translation motion data TMD_filt. In an example embodiment, the first filter 565 may be a low pass filter.

In operation S160, the electronic device 10 may perform a second filtering operation on rotation motion data received from a gyroscope (such as accumulated rotation motion data RMD_acc) to generate filtered rotation motion data. In an example embodiment, the second filtering may involve applying a second filter 566 included in the motion information generator 562 to the accumulated rotation motion data RMD_acc to generate the filtered rotation motion data RMD_filt. In an example embodiment, the second filtering operation may have a complementary relationship with the first filtering operation. In one such example embodiment, the first filter 565 may be a low-pass filter, and the second filter 566, as a complementary filtering process, may be a high-pass filter. In an example embodiment, the second filter 566 may be a band pass filter.

In operation S180, the electronic device 10 may generate a stabilized image based at least on the filtered translation motion data and the filtered rotation motion data. The stabilized image generated using the filtered translation motion data and the filtered rotation motion data may compensate for motion of the electronic device while capturing the image. In some example embodiments, the generating may use motion information MI that is based, at least, on the filtered translation motion data TMD_filt and the filtered rotation motion data RMD_filt. In an example embodiment, an adder 567 included in the motion information generator 562 may perform an operation of combining (e.g., summing or averaging) at least a portion of the filtered translation motion data TMD_filt and at least a portion of the filtered rotation motion data RMD_filt to generate the motion information MI.

Figure 6:
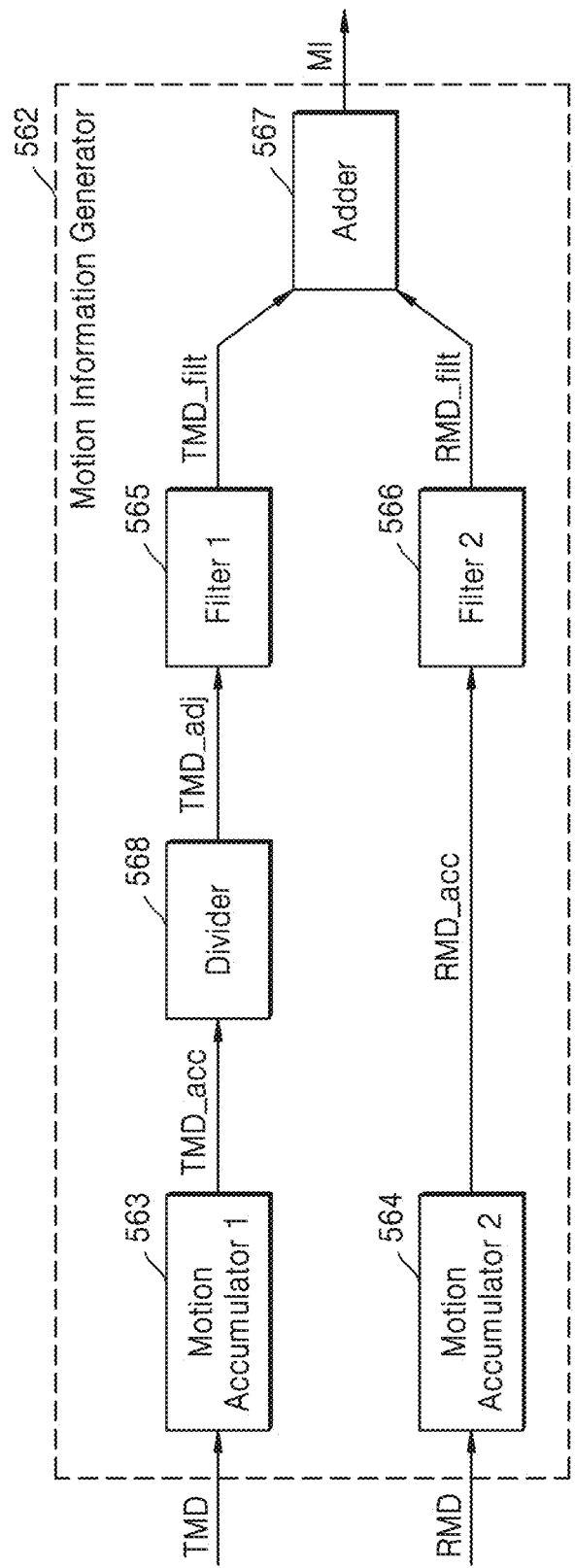
FIG. 6 is a diagram illustrating a motion information generator according to an example embodiment.

FIG. 6 is a diagram illustrating a motion information generator 562 according to an example embodiment. In describing the motion information generator 562, description already given with reference to FIGS. 3 and 5 is omitted. The motion information generator 562 will be described below with reference to FIG. 6 in conjunction with FIGS. 1 and 3.

The motion information generator 562 may further include a divider 568 in addition to a configuration of the motion information generator 562 of FIG. 5.

The divider 568 may receive accumulated translation motion data TMD_acc from a first motion accumulator 563 and may divide the accumulated translation motion data TMD_acc by a focal length of the lens 520 to generate adjusted translation motion data TMD_adj. In this case, the divider 568 may first perform an operation of matching the accumulated translation motion data TMD_acc with a unit of the focal length. For example, in a case where a unit of each of pieces of data included in the accumulated translation motion data TMD_acc is a pixel, a division operation may be performed after a unit of the focal length, so that a unit of the focal length of the lens 520 becomes a pixel. As a result, the divider 568 may match a unit of the accumulated translation motion data TMD_acc with a unit of the accumulated rotation motion data RMD_acc.

The first filter 565 may perform a first filtering operation on the adjusted translation motion data TMD_adj provided by the divider 568 to generate filtered translation motion data TMD_filt.

By using the motion information generator 562 according to an example embodiment, the electronic device 10 may perform the first filtering operation and the second filtering operation on each of accumulated translation motion data and accumulated rotation motion data, and moreover, may match units of filtered translation motion data and filtered rotation motion data combined by the adder 567.

FIG. 7 is a flowchart of a motion information generating method of an electronic device, according to an example embodiment. The motion information generating method will be described below with reference to FIG. 7 in conjunction with FIGS. 1, 3, and 6.

In operation S210, the electronic device 10 may divide the accumulated translation motion data TMD_acc by a focal length of the lens 520 to generate adjusted translation motion data TMD_adj. In an example embodiment, the divider 568 included in the motion information generator 562 may divide the accumulated translation motion data TMD_acc by the focal length of the lens 520 to generate the adjusted translation motion data TMD_adj.

In operation S220, the electronic device 10 may filter the adjusted translation motion data TMD_adj by using the first filter 565. In an example embodiment, the first filter 565 included in the motion information generator 562 may perform a first filtering operation on the adjusted translation motion data TMD_adj to generate the filtered translation motion data TMD_filt. In an example embodiment, the first filter 565 may be a low pass filter.

In operation S240, the electronic device 10 may filter the accumulated rotation motion data RMD_acc by using the second filter 566. In an example embodiment, the second filter 566 included in the motion information generator 562 may perform a second filtering operation on the accumulated rotation motion data RMD_acc to generate the filtered rotation motion data RMD_filt. In an example embodiment, the second filtering operation may have a complementary relationship with the first filtering operation. Also, in an example embodiment, the second filter 566 may be a band pass filter.

In operation S260, the electronic device 10 may generate the motion information MI based on the filtered translation motion data TMD_filt and the filtered rotation motion data RMD_filt. In an example embodiment, the adder 567 included in the motion information generator 562 may sum and/or average at least a portion of the filtered translation motion data TMD_filt and at least a portion of the filtered rotation motion data RMD_filt to generate the motion information MI.

In operation S270, the electronic device 10 may generate a stabilized image based at least on the motion information MI, wherein generating the stabilized image compensates for the motion of the electronic device while capturing the image.

FIG. 8A is a graph showing accumulated translation motion data TMD_acc and filtered translation motion data TMD_filt with respect to time, according to an example embodiment.

An accumulated translation motion curve 601 may represent a graph of the accumulated translation motion data TMD_acc with respect to time. In the y axis of the graph, 0 may represent an initial position of an electronic device, and the accumulated translation motion curve 601 may represent a graph where pieces of data corresponding to one direction among pieces of data included in the accumulated translation motion data TMD_acc are plotted with respect to time, and then, plotted dots are connected.

A filtered translation motion curve 602 may represent a graph of the filtered translation motion data TMD_filt with respect to time. The filtered translation motion data TMD_filt may be data obtained by performing a low pass filtering operation on the accumulated translation motion data TMD_acc.

In some example embodiments, an electronic device may adjust image data to compensate for translation motion of the electronic device based on translation motion that includes low-frequency components but not high-frequency components. In an example embodiment, an electronic device may use filtered translation motion data TMD_filt, representing a graph such as the accumulated translation motion curve 601 from which a high frequency component is removed, to adjust the image data in a manner that may compensate for the translation motion.

In some example embodiments, although not shown in the graph, an electronic device may compensate for image data based on a rotation motion that includes high-frequency components but not low-frequency components. In an example embodiment, an electronic device may remove a low frequency component from the accumulated translation motion data TMD_acc and may use the filtered translation motion data TMD_filt to adjust the image data in a manner that may compensate for the rotational motion.

FIG. 8B is a diagram showing accumulated translation motion data TMD_acc according to an example embodiment. The accumulated translation motion data TMD_acc may represent a 1D matrix form. The accumulated translation motion data TMD_acc may include n (where n is a natural number) number of elements. An electronic device may accumulate translation motion data to generate the accumulated translation motion data TMD_acc and may manage the accumulated translation motion data TMD_acc. The electronic device may perform a first filtering operation on the accumulated translation motion data TMD_acc to generate filtered translation motion data.

Figures 9A, 9B:
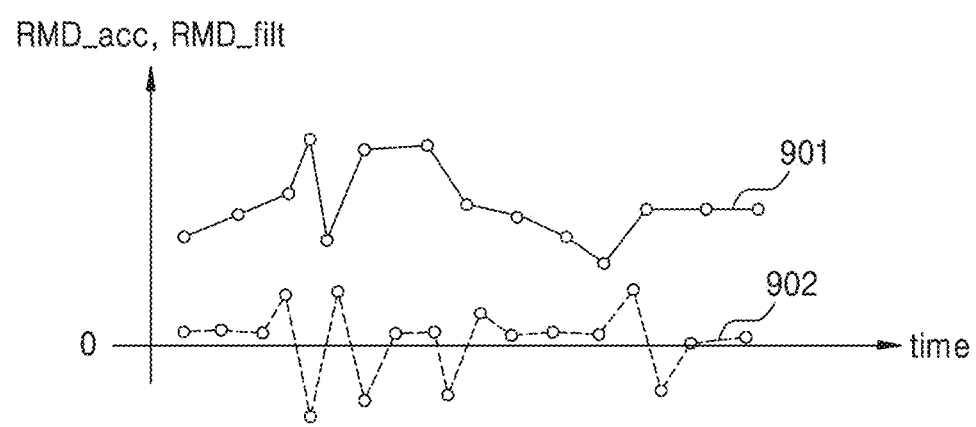
FIG. 9A is a graph showing accumulated rotation motion data and filtered rotation motion data with respect to time, according to an example embodiment.
FIG. 9B is a diagram showing accumulated rotation motion data according to an example embodiment.

FIG. 9A is a graph showing accumulated rotation motion data RMD_acc and filtered rotation motion data RMD_filt with respect to time, according to an example embodiment.

An accumulated rotation motion curve 901 may represent a graph of the accumulated rotation motion data RMD_acc with respect to time. In the y axis of the graph, 0 may represent an initial position of an electronic device, and the accumulated rotation motion curve 901 may represent a graph where pieces of data corresponding to one direction among pieces of data included in the accumulated rotation motion data RMD_acc are plotted with respect to time, and then, plotted dots are connected.

A filtered rotation motion curve 902 may represent a graph of the filtered rotation motion data RMD_filt with respect to time. The filtered rotation motion data RMD_filt may be data obtained by performing a high pass filtering operation on the accumulated rotation motion data RMD_acc.

FIG. 9B is a diagram showing accumulated rotation motion data RMD_acc according to an example embodiment. The accumulated rotation motion data RMD_acc may represent a 1D matrix form. The accumulated rotation motion data RMD_acc may include m (where m is a natural number) number of elements. An electronic device may accumulate rotation motion data to generate the accumulated rotation motion data RMD_acc and may manage the accumulated rotation motion data RMD_acc. The electronic device may perform a second filtering operation on the accumulated rotation motion data RMD_acc to generate filtered rotation motion data.

Figure 10:
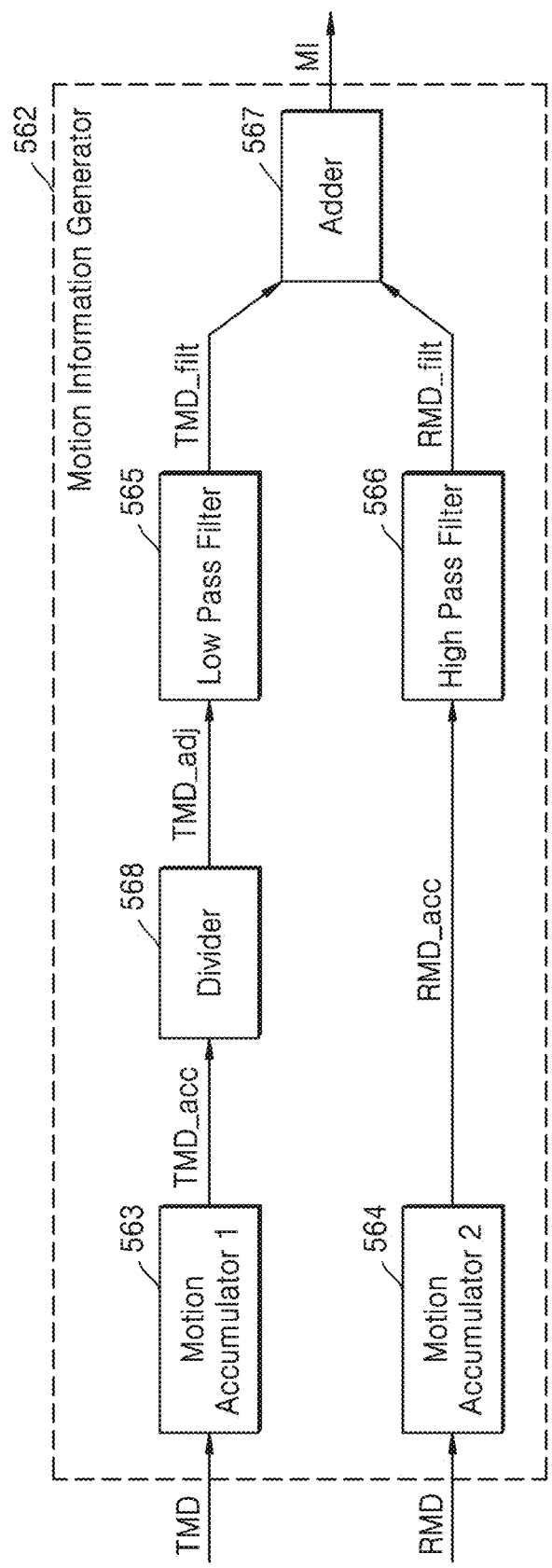
FIG. 10 is a diagram illustrating a motion information generator according to an example embodiment.

FIG. 10 is a diagram illustrating a motion information generator 562 according to an example embodiment. In describing the motion information generator 562, description already given with reference to FIG. 6 is omitted.

In FIG. 10, unlike FIG. 6, a first filter 565 may be a low pass filter 565, and a second filter 566 may be a band pass filter 566.

As described above with reference to FIG. 8A, in a process of generating motion information MI, the motion information generator 562 may usefully use pieces of data having a low frequency component among pieces of accumulated translation motion data TMD_acc and may usefully use pieces of data having a high frequency component among pieces of accumulated rotation motion data RMD_acc.

Therefore, the low pass filter 565 may perform a low pass filtering operation on adjusted translation motion data TMD_adj to generate filtered translation motion data TMD_filt.

Moreover, the high pass filter 566 may perform a high pass filtering operation on accumulated rotation motion data RMD_acc to generate filtered rotation motion data RMD_filt.

Figure 11:
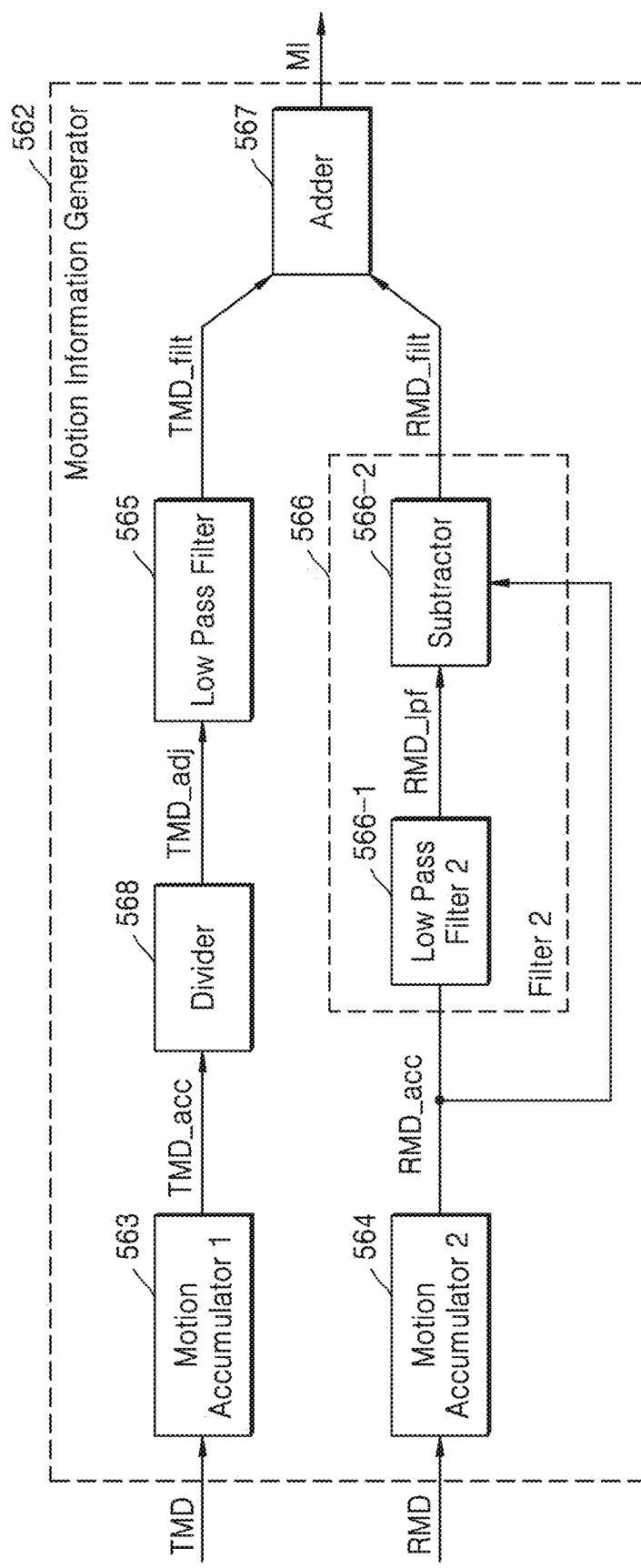
FIG. 11 is a diagram illustrating a motion information generator according to an example embodiment.

FIG. 11 is a diagram illustrating a motion information generator 562 according to an example embodiment. In describing the motion information generator 562, description already given with reference to FIGS. 6 and 10 is omitted.

In FIG. 11, unlike FIG. 6, a first filter 565 may be a first low pass filter 565, and a second filter 566 may include a second low pass filter 566-1 and a subtractor 566-2. Also, unlike FIG. 10, the second filter 566 that is a high pass filter may be implemented with the second low pass filter 566-1.

The first low pass filter 565 may perform a low pass filtering operation on adjusted translation motion data TMD_adj to generate filtered translation motion data TMD_filt.

The second low pass filter 566-1 may perform the low pass filtering operation on accumulated rotation motion data RMD_acc to generate low pass rotation motion data RMD_lpf. The subtractor 566-2 may subtract the low pass rotation motion data RMD_lpf from the accumulated rotation motion data RMD_acc to generate filtered rotation motion data RMD_filt. Operations of the second low pass filter 566-1 and the subtractor 566-2 may be provided as one operation and may represent an operation of one high pass filter 566.

Figure 12:
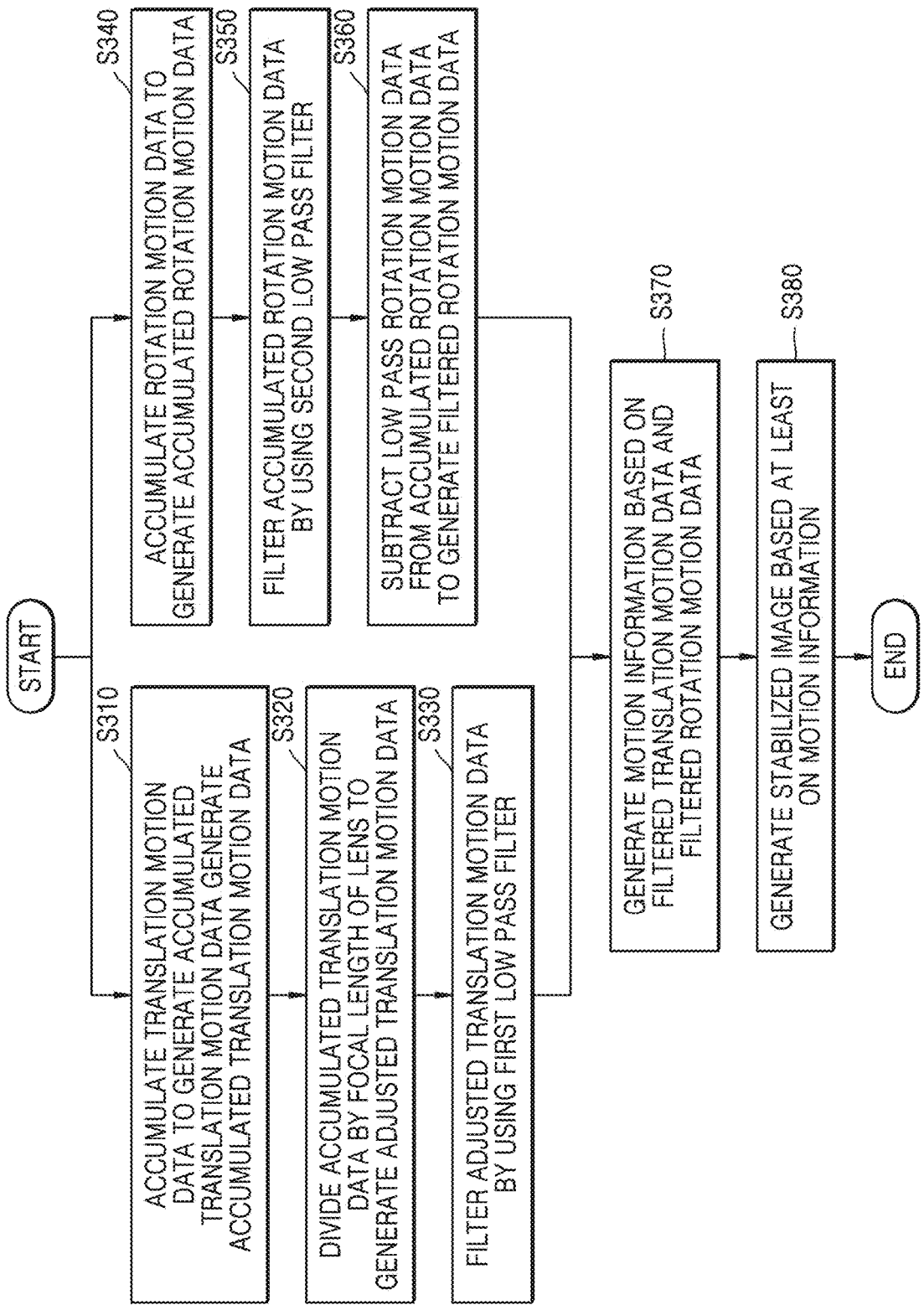
FIG. 12 is a flowchart of a motion information generating method of an electronic device, according to an example embodiment.

FIG. 12 is a flowchart of a motion information generating method of an electronic device, according to an example embodiment. FIG. 12 illustrates a flowchart corresponding to the example embodiment of FIG. 11. The motion information generating method will be described below with reference to FIG. 12 in conjunction with FIGS. 1 and 11.

In operation S310, the electronic device 10 may accumulate the translation motion data TMD to generate the accumulated translation motion data TMD_acc. In an example embodiment, the first motion accumulator 563 included in the motion information generator 562 may accumulate the translation motion data TMD with time to generate the accumulated translation motion data TMD_acc.

In operation S320, the electronic device 10 may divide the accumulated translation motion data TMD_acc by the focal length of the lens 520 to generate the adjusted translation motion data TMD_adj. In an example embodiment, the divider 568 included in the motion information generator 562 may divide the accumulated translation motion data TMD_acc by the focal length of the lens 520 to generate the adjusted translation motion data TMD_adj.

In operation S330, the electronic device 10 may filter the adjusted translation motion data TMD_adj by using the first low pass filter 565. In an example embodiment, the first low pass filter 565 included in the motion information generator 562 may perform a low pass filtering operation on the adjusted translation motion data TMD_adj to generate the filtered translation motion data TMD_filt.

In operation S340, the electronic device 10 may accumulate the rotation motion data RMD to generate the accumulated rotation motion data RMD_acc. In an example embodiment, the second motion accumulator 564 included in the motion information generator 562 may accumulate the rotation motion data RMD with time to generate the accumulated rotation motion data RMD_acc.

In operation S350, the electronic device 10 may filter the accumulated rotation motion data RMD_acc by using the second low pass filter 566-1. In an example embodiment, the second low pass filter 566-1 included in the motion information generator 562 may perform a low pass filtering operation on the accumulated rotation motion data RMD_acc to generate the low pass rotation motion data RMD_lpf.

In operation S360, the electronic device 10 may subtract the low pass rotation motion data RMD_lpf from the accumulated rotation motion data RMD_acc to generate the filtered rotation motion data RMD_filt. In an example embodiment, the subtractor 566-2 included in the motion information generator 562 may subtract the low pass rotation motion data RMD_lpf from the accumulated rotation motion data RMD_acc to generate the filtered rotation motion data RMD_filt.

In operation S370, the electronic device 10 may generate the motion information MI based on the filtered translation motion data TMD_filt and the filtered rotation motion data RMD_filt. In an example embodiment, the adder 567 included in the motion information generator 562 may perform an operation of combining (e.g., summing and/or averaging) at least a portion of the filtered translation motion data TMD_filt and at least a portion of the filtered rotation motion data RMD_filt to generate the motion information MI.

In operation S380, the electronic device 10 may generate a stabilized image based at least on the motion information MI, wherein generating the stabilized image compensates for the motion of the electronic device while capturing the image.

Figure 13:
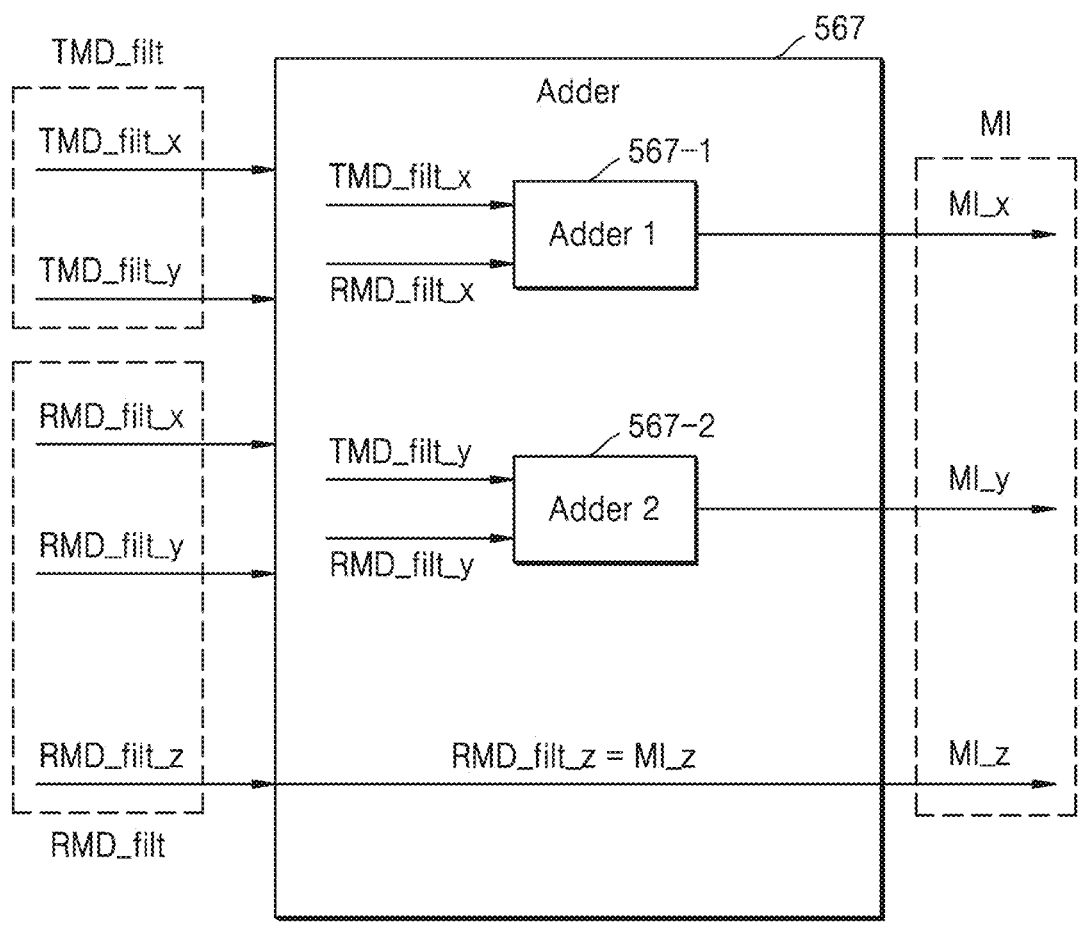
FIG. 13 is a diagram illustrating an adder according to an example embodiment.

FIG. 13 is a diagram illustrating an adder 567 according to an example embodiment. In an example embodiment, the adder 567 may include a first adder 567-1 and a second adder 567-2.

In an example embodiment, translation motion data may include first axis-direction translation motion data and second axis-direction translation motion data, and rotation motion data may include first axis-direction rotation motion data, second axis-direction rotation motion data, and third axis-direction rotation motion data. Therefore, filtered translation motion data TMD_filt may include filtered first axis-direction translation motion data TMD_filt_x and filtered second axis-direction translation motion data TMD_filt_y, and filtered rotation motion data RMD_filt may include filtered first axis-direction rotation motion data RMD_filt_x, filtered second axis-direction rotation motion data RMD_filt_y, and filtered third axis-direction rotation motion data RMD_filt_z.

The first adder 567-1 may combine (e.g., summing and/or averaging) the first axis-direction translation motion data TMD_filt_x and the filtered first axis-direction rotation motion data RMD_filt_x to generate first axis-direction motion information MI_x. The first axis-direction motion information MI_x may be referred to as first motion information.

The second adder 567-2 may combine (e.g., summing and/or averaging) the second axis-direction translation motion data TMD_filt_y and the filtered second axis-direction rotation motion data RMD_filt_y to generate second axis-direction motion information MI_y. The second axis-direction motion information MI_y may be referred to as second motion information.

The adder 567 may output the filtered third axis-direction rotation motion data RMD_filt_z as third axis-direction motion information MI_z. The third axis-direction motion information MI_z may be referred to as third motion information.

Finally, the adder 567 may output first axis-direction motion data MI_x, second axis-direction motion data MI_Y, and third axis-direction motion data MI_Z as motion information MI.

Figure 14:
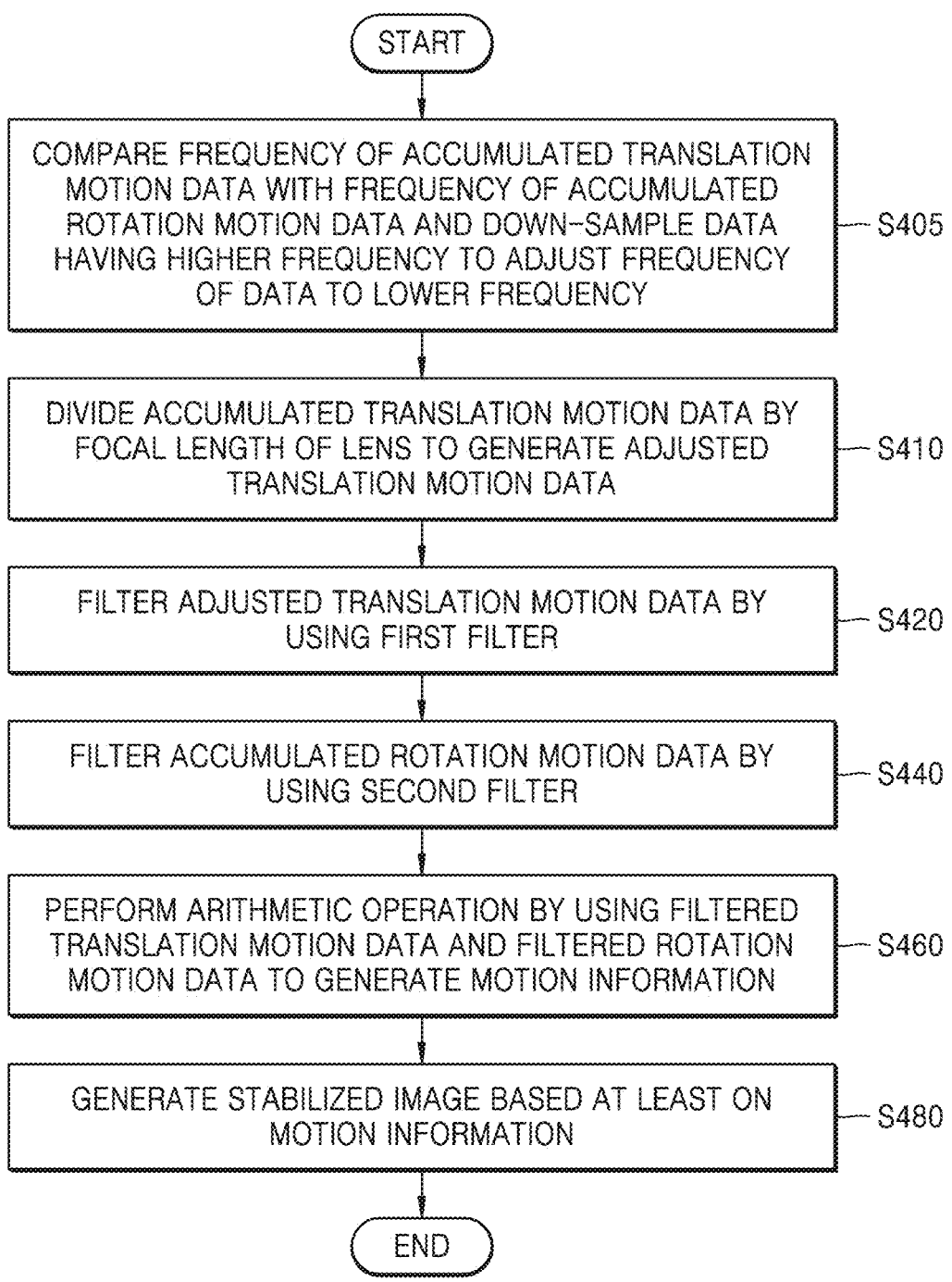
FIG. 14 is a flowchart of a motion information generating method of an electronic device, according to an example embodiment.

FIG. 14 is a flowchart of a motion information generating method of an electronic device, according to an example embodiment. Particularly, FIG. 14 illustrates an example embodiment where processing is performed on each of accumulated translation motion data and accumulated rotation motion data having different frequencies. The motion information generating method will be described below with reference to FIG. 14 in conjunction with FIGS. 1 and 4.

A frequency of the accumulated translation motion data TMD_acc may represent a frequency corresponding to a period where new translation motion data is accumulated, and a frequency of the accumulated rotation motion data RMD_acc may represent a frequency corresponding to a period where new rotation motion data is accumulated. In this case, in an example embodiment, the frequency of the accumulated translation motion data TMD_acc may correspond to an imaging frequency at which the image sensor 540 generates the image data IMG, and the frequency of the accumulated rotation motion data RMD_acc may be equal to a frequency at which the gyroscope 420 generates the rotation motion data RMD.

In operation S405, the electronic device 10 may compare the frequency of the accumulated translation motion data TMD_acc with the frequency of the accumulated rotation motion data RMD_acc and may down-sample data having a higher frequency to adjust a frequency of the data to a lower frequency. For example, when the frequency of the accumulated translation motion data TMD_acc (which may be based on an imaging frequency at which the image sensor provides image data) is higher than the frequency of the accumulated rotation motion data RMD_acc, the electronic device 10 may down-sample the accumulated translation motion data TMD_acc to adjust a frequency of data to the frequency of the accumulated rotation motion data RMD_acc. On the other hand, when the frequency of the accumulated rotation motion data RMD_acc is higher than the frequency of the accumulated translation motion data TMD_acc (which may be based on an imaging frequency at which the image sensor provides image data), the electronic device 10 may down-sample the accumulated rotation motion data RMD_acc to adjust a frequency of data to the frequency of the accumulated translation motion data TMD_acc.

Subsequently, operations S410, S420, S440, S460, and S480 may be substantially the same as operations S210, S220, S240, S260, and S270 of FIG. 7, respectively.

Figure 15:
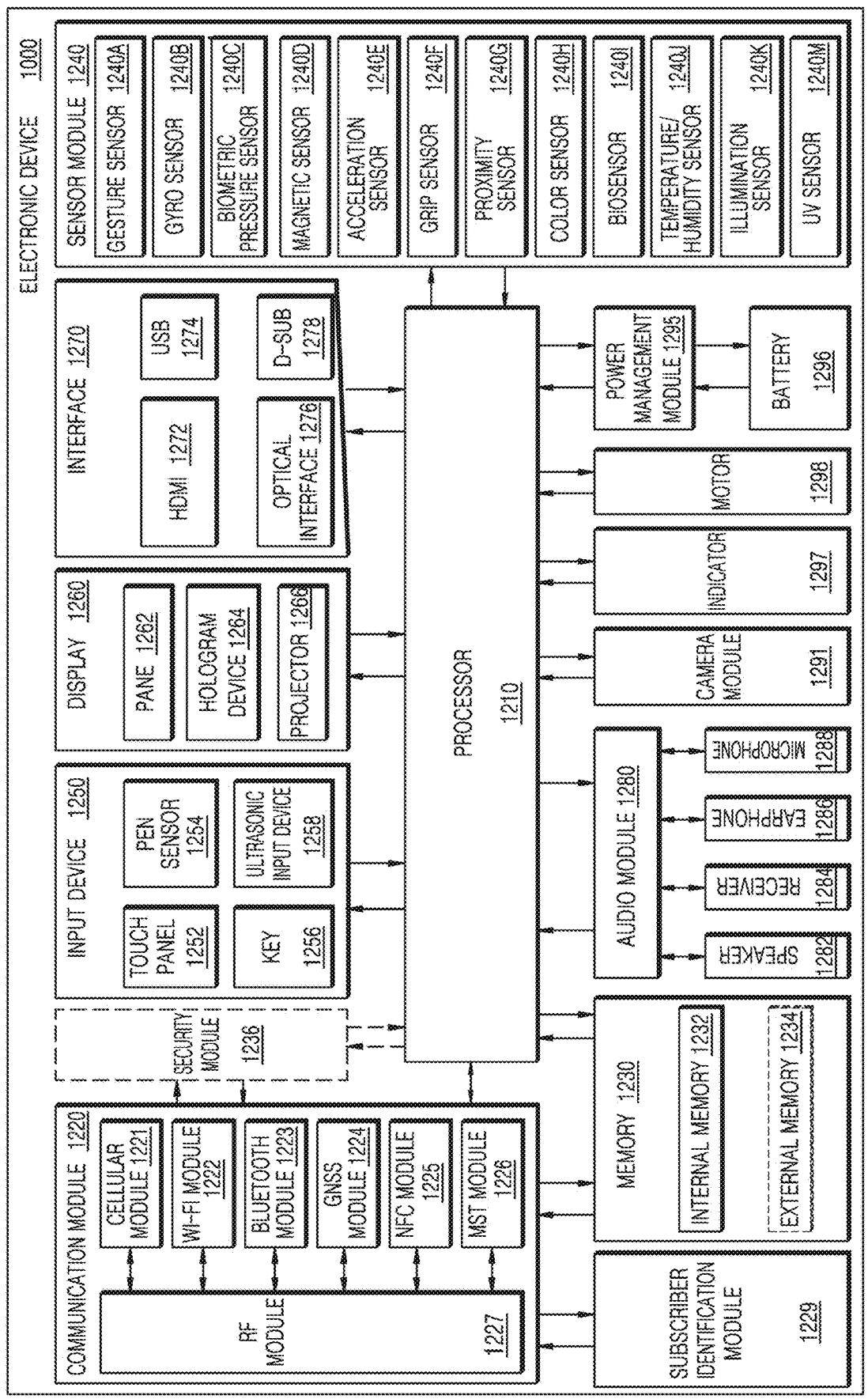
FIG. 15 is a diagram illustrating an electronic device according to an example embodiment.

FIG. 15 is a diagram illustrating an electronic device 1000 according to an example embodiment.

The electronic device 1000 may include, for example, all or some elements of the electronic device 10 illustrated in FIG. 1. The electronic device 1000 may include at least one processor (for example, an application program (AP)) 1210, a communication device 1220, a subscriber identification device 1229, a memory 1230, a sensor 1240, an input device 1250, a display 1260, an interface 1270, an audio device 1280, a camera 1291, a power management device 1295, a battery 1296, an indicator 1297, and a motor 1298.

The processor 1210 may drive, for example, an OS or an AP, to control a plurality of hardware or software elements connected to the processor 1210 and may perform various processing and operations on data. The processor 1210 may be implemented as, for example, a system on chip (SoC). According to an example embodiment, the processor 1210 may further include a graphics processing unit (GPU) and/or an image signal processor. The processor 1210 may include at least some (for example, a cellular device 1221) of the elements illustrated in FIG. 2. The processor 1210 may load an instruction or data, received from at least one of the other elements (for example, a non-volatile memory), into a volatile memory and may store various pieces of data in the non-volatile memory.

The communication device 1220 may have an element that is the same as or similar to the communication interface 170 of FIG. 1. The communication device 1220 may include, for example, the cellular device 1221, a Wi-Fi device 1222, a Bluetooth device 1223, a global navigation satellite system (GNSS) device (for example, a global positioning system (GPS) device, a GLONASS module, a BeiDou Navigation Satellite System (BDS) module, or a Galileo module) 1224, a near field communication (NFC) device 1225, a multi-species transport (MST) device 1226, and a radio frequency (RF) device 1227.

The cellular device 1221 may provide, for example, a voice call, an image or video call, a text message service, or an Internet service over a communication network. According to an example embodiment, the cellular device 1221 may perform identification and authentication of the electronic device 1000 in the communication network by using the subscriber identification device (for example, a subscriber identification device (SIM) card) 1229. According to an example embodiment, the cellular device 1221 may perform at least some of functions provided by the processor 1210. According to an example embodiment, the cellular device 1221 may include a communication processor (CP).

In some example embodiments, each of the Wi-Fi device 1222, the Bluetooth device 1223, the GNSS device 1224, the NFC device 1225, and the MST device 1226 may include a processor for processing data transmitted or received through a corresponding device. In some example embodiments, at least some (for example, two or more) of the Wi-Fi device 1222, the Bluetooth device 1223, the GNSS device 1224, the NFC device 1225, and the MST device 1226 may be included in one integrated chip (IC) or in an IC package.

The RF device 1227 may transmit or receive, for example, a communication signal (for example, an RF signal). The RF device 1227 may include, for example, a transceiver, a power amplification device (PAM), a frequency filter, a low noise amplifier (LNA), an antenna, or the like. In other example embodiments, at least one of the Wi-Fi device 1222, the Bluetooth device 1223, the GNSS device 1224, the NFC device 1225, and the MST device 1226 may transmit or receive an RF signal through a separate RF device.

The subscriber identification device 1229 may include, for example, a card and/or an embedded SIM each including a subscriber identification device. In some example embodiments, the subscriber identification device 1229 may include identification information (for example, an integrated circuit card identifier (ICCID) and/or subscriber information (for example, international mobile subscriber identity (IMSI)).

The memory 1230 may include, for example, an internal memory 1232 or an external memory 1234. The internal memory 1232 may include, for example, at least one of a volatile memory (for example, DRAM, SRAM, SDRAM, or the like) and a non-volatile memory (for example, one time programmable ROM (OTPROM), PROM, EPROM, EEPROM, mask ROM, flash ROM, flash memory (for example, NAND flash memory) or NOR flash memory), or the like), hard drive, and SSD.

The external memory 1234 may further include flash drive (e.g., CF, SD, Micro-SD, Mini-SD, xD, multimedia card (MMC), memory stick, or the like). The external memory 1234 may be functionally and/or physically connected to the electronic device 1000 through various interfaces.

A security device 1236 may include a storage space that is higher in security level than the memory 1230 and may be a circuit for ensuring safe storing of data and a protected execution environment. The security device 1236 may be implemented as a separate circuit and may include a separate processor. The security device 1236 may include, for example, an embedded security element (eSE) that is provided in an attachable smart chip, an SD card, or a fixed chip of the electronic device 1000. Also, the security device 1236 may be driven by another OS that differs from the OS of the electronic device 1000. For example, the security device 1236 may operate based on a java card open platform (JCOP) OS.

The sensor device 1240 may measure physical quantity or may sense an operating state of the electronic device 1000, thereby converting measured or sensed information into an electrical signal. The sensor device 1240 may include, for example, at least one of a gesture sensor 1240A, a gyro sensor 1240B, a biometric pressure sensor 1240C, a magnetic sensor 1240D, an acceleration sensor 1240E, a grip sensor 1240F, a proximity sensor 1240G, a color sensor (for example, an RGB sensor) 1240H, a biosensor 1240I, a temperature/humidity sensor 1240J, an illumination sensor 1240K, and an ultraviolet (UV) sensor 1240M. Additionally or alternatively, the sensor device 1240 may include, for example, an E-nose sensor, an electromyography (EMG) sensor, an electroencephalogram (EEG) sensor, an electrocardiogram (ECG) sensor, an infrared sensor, an iris sensor, and/or a fingerprint sensor. The sensor device 1240 may further include a control circuit for controlling one or more sensors thereof. In some example embodiments, the electronic device 1000 may further include another processor that is configured as a portion of the processor 1210 or a separate element to control the sensor device 1240. While the processor 1210 is in a sleep state, the other processor may control the sensor device 1240.

The input device 1250 may include, for example, a touch panel 1252, a (digital) pen sensor 1254, a key 1256, or an ultrasonic input device 1258. The touch panel 1252 may use, for example, at least one of a capacitive type, a pressure sensitive type, an infrared type, and an ultrasonic type. Also, the touch panel 1252 may further include a control circuit. The touch panel 1252 may further include a tactile layer, and thus, may provide a tactile reaction to a user.

The (digital) pen sensor 1254, for example, may be a portion of the touch panel 1252 or may include a separate recognition sheet. The key 1256 may include, for example, a physical button, an optical key, or a keypad. The ultrasonic input device 1258 may sense, through a microphone 1288, an ultrasonic wave generated in an input tool to check data corresponding to the sensed ultrasonic wave.

The display 1260 may include a panel 1262, a hologram device 1264, or a projector 1266. The panel 1262 may be implemented to be flexible, transparent, or wearable. The panel 1262 may be configured as one device including the touch panel 1252. The hologram device 1264 may display a stereoscopic image on a space by using interference of light. The projector 1266 may project light onto a screen to display an image. The screen may be located inside or outside, for example, the electronic device 1000. In an example embodiment, the panel 1262 may include a pressure sensor (or a force sensor) for measuring an intensity of pressure of a user touch. The pressure sensor may be implemented as one body with the touch panel 1252, or may be implemented as one or more sensors independent of the touch panel 1252. In an example embodiment, the display 1260 may further include a control circuit for controlling the panel 1262, the hologram device 1264, or the projector 1266.

The interface 1270 may include, for example, a high definition multimedia interface (HDMI) 1272, a universal serial bus (USB) 1274, an optical interface 1276, or a D-subminiature (D-sub) interface 1279. Additionally or alternatively, the interface 1270 may include, for example, a mobile high-definition link (MHIL) interface, a secure digital (SD) card/multimedia card (MMC) interface, or infrared data association (IrDA) interface.

The audio device 1280 may convert, for example, a sound and an electrical signal in a two-way direction. The audio device 1280 may process, for example, sound information input or output through a speaker 1282, a receiver 1284, an earphone 1286, or the microphone 1288.

The camera 1291 may be, for example, capable of capturing a still image and/or a moving image. In an example embodiment, the camera 1291 may include one or more image sensors (for example, a front sensor or a rear sensor), a lens, an image signal processor (ISP), or a flash (for example, a light-emitting diode (LED) or a xenon lamp). The camera 1291, as described above with reference to FIGS. 1 to 14, may perform an image stabilizing operation.

The power management device 1295 may manage, for example, power of the electronic device 1000. In an example embodiment, the power management device 1295 may include a power management integrated circuit (PMIC), a charger integrated circuit (IC), or a battery or fuel gauge. The PMIC may have a wired and/or wireless charging type. A wireless charging type may include, for example, a magnetic resonance type, a magnetic induction type, or an electromagnetic wave type. The power management device 1295 may further include an additional circuit (for example, a coil loop, a resonant circuit, or a rectifier) for wireless charging. The battery or fuel gauge may measure, for example, a remaining capacity, a voltage charged, a current, or a temperature of the battery 1296. The battery 1296 may include, for example, a rechargeable battery and/or a solar battery.

The indicator 1297 may display a certain state (for example, a booting state, a message state, a charging state, or the like) of the electronic device 1000 or each of some elements (for example, the processor 1210) of the electronic device 1000. The motor 1298 may receive an electrical signal and produce mechanical output, such as a vibration or a haptic effect. Although not shown, the electronic device 1000 may include a processing device (for example, a GPU) for supporting a mobile television (TV). A processing device for supporting the mobile TV may process, for example, media data for digital multimedia broadcasting (DMB), digital video broadcasting (DVB), or Media FLO™.

While the present disclosure has been particularly shown and described with reference to example embodiments thereof, it will be understood that various changes in form and details may be made therein without departing from the spirit and scope of the following claims.

What is claimed is:

1. An electronic device comprising:
    an image sensor configured to receive light transmitted through a lens and to generate image data;
    a gyroscope configured to generate rotation motion data of the electronic device; and
    an image stabilizer configured to,
        generate translation motion data of the electronic device based on the image data received from the image sensor,
        perform a first filtering operation on the translation motion data to generate filtered translation motion data,
        perform a second filtering operation on the rotation motion data received from the gyroscope to generate filtered rotation motion data, and
        generate a stabilized image based at least on the filtered translation motion data and the filtered rotation motion data, wherein the stabilized image compensates for motion of the electronic device while capturing an image.

2. The electronic device of claim 1, wherein the image stabilizer is configured to accumulate the translation motion data to generate accumulated translation motion data having a one-dimensional matrix form and to perform the first filtering operation on the accumulated translation motion data to generate the filtered translation motion data.

3. The electronic device of claim 1, wherein the image stabilizer is configured to accumulate the translation motion data to generate accumulated translation motion data having a one-dimensional matrix form, and to divide the accumulated translation motion data by a focal length of the lens and perform the first filtering operation to generate the filtered translation motion data.

4. The electronic device of claim 1, wherein the image stabilizer is configured to accumulate the rotation motion data to generate accumulated rotation motion data having a one-dimensional matrix form and to perform the second filtering operation on the accumulated rotation motion data to generate the filtered rotation motion data.

5. The electronic device of claim 4, wherein,
    the first filtering operation is a first low pass filtering operation, and
    the image stabilizer is configured to perform a second low pass filtering operation on the accumulated rotation motion data to generate low pass rotation motion data and to subtract the low pass rotation motion data from the accumulated rotation motion data to generate the filtered rotation motion data.

6. The electronic device of claim 1, wherein the first filtering operation and the second filtering operation are complementary filtering operations.

7. The electronic device of claim 1, wherein,
    the first filtering operation is a low pass filtering operation, and
    the second filtering operation is a high pass filtering operation.

8. The electronic device of claim 1, wherein the image stabilizer includes,
    a motion estimator configured to generate the translation motion data, based on the image data,
    a motion information generator configured to accumulate the translation motion data received from the motion estimator, perform the first filtering operation on accumulated translation motion data to generate the filtered translation motion data, perform the second filtering operation on the rotation motion data received from the gyroscope to generate the filtered rotation motion data, and generate motion information based at least on the filtered translation motion data and the filtered rotation motion data, and
    a motion compensator configured to compensate for a motion of the electronic device with respect to the image data to generate compensated image data, based on the motion information received from the motion information generator.

9. The electronic device of claim 1, wherein,
    the translation motion data comprises first axis-direction translation motion data and second axis-direction translation motion data, and the rotation motion data comprises first axis-direction rotation motion data, second axis-direction rotation motion data, and third axis-direction rotation motion data.

10. The electronic device of claim 9, wherein,
the filtered translation motion data comprises filtered first axis-direction translation motion data and filtered second axis-direction translation motion data,
the filtered rotation motion data comprises filtered first axis-direction rotation motion data, filtered second axis-direction rotation motion data, and filtered third axis-direction rotation motion data, and
the image stabilizer is configured to combine the filtered first axis-direction translation motion data and the filtered first axis-direction rotation motion data to generate first motion information, combine the filtered second axis-direction translation motion data and the filtered second axis-direction rotation motion data to generate second motion information, and generate the filtered third axis-direction rotation motion data as third motion information.

11. The electronic device of claim 1, wherein the image stabilizer is configured to,
compare a sensing frequency of the gyroscope with an imaging frequency at which the image sensor provides the image data,
on condition of the imaging frequency being higher than the sensing frequency, down-sample the translation motion data, and
on condition of the sensing frequency being higher than the imaging frequency, down-sample the rotation motion data.

12. The electronic device of claim 1, wherein an operation of the image stabilizer is configured to be activated in response to the electronic device starting one of a moving image photographing operation, a time lapse photographing operation, and a panorama photographing operation each using the lens.

13. A camera comprising:
a lens;
a gyroscope configured to generate rotation motion data;
an image sensor configured to generate image data from light transmitted through the lens; and
an image stabilizer configured to,
generate translation motion data based on the image data received from the image sensor,
perform a first filtering operation on the translation motion data to generate filtered translation motion data,
receive the rotation motion data from the gyroscope,
perform a second filtering operation on the rotation motion data to generate filtered rotation motion data, and
generate a stabilized image based at least on the filtered translation motion data and the filtered rotation motion data, wherein the stabilized image compensates for rotational and/or translational motion of the camera while capturing an image.

14. The camera of claim 13, wherein the image stabilizer is configured to,
generate accumulated translation motion data,
divide the accumulated translation motion data by a focal length of the lens to generate adjusted translation motion data,
perform the first filtering operation on the adjusted translation motion data to generate the filtered translation motion data,
generate accumulated rotation motion data, and
perform the second filtering operation, having a complementary relationship with the first filtering operation, on the accumulated rotation motion data to generate the filtered rotation motion data.

15. The camera of claim 14, wherein,
the first filtering operation is a low pass filtering operation, and
the second filtering operation is a high pass filtering operation.

16. An image stabilizing method of an electronic device including a lens, the image stabilizing method comprising:
receiving image data based on light transmitted through the lens;
accumulating translation motion data based on the image data to generate accumulated translation motion data;
filtering, using a first filter, the accumulated translation motion data to generate filtered translation motion data;
accumulating rotation motion data obtained by a gyroscope to generate accumulated rotation motion data;
filtering, using a second filter, the accumulated rotation motion data to generate filtered rotation motion data; and
generating a stabilized image based at least on the filtered translation motion data and the filtered rotation motion data, wherein the stabilized image compensates for motion of the electronic device while capturing an image.

17. The image stabilizing method of claim 16, wherein,
each of the accumulated translation motion data and the accumulated rotation motion data is data having a one-dimensional matrix form, and
the generating of the filtered translation motion data comprises dividing the accumulated translation motion data by a focal length of the lens to generate adjusted translation motion data and filtering, by using the first filter, the adjusted translation motion data having the one-dimensional matrix form.

18. The image stabilizing method of claim 16, wherein,
the first filter comprises a low pass filter, and
the second filter comprises a high pass filter.

19. The image stabilizing method of claim 18, wherein,
each of the accumulated translation motion data and the accumulated rotation motion data is data having a one-dimensional matrix form, and
the generating of the filtered rotation motion data includes,
filtering, by using a second low pass filter, the accumulated rotation motion data having the one-dimensional matrix form to generate low pass rotation motion data; and
subtracting the low pass rotation motion data from the accumulated rotation motion data to generate the filtered rotation motion data.

20. The image stabilizing method of claim 16, wherein,
the filtered translation motion data comprises filtered first axis-direction translation motion data and filtered second axis-direction translation motion data,
the filtered rotation motion data comprises filtered first axis-direction rotation motion data, filtered second axis-direction rotation motion data, and filtered third axis-direction rotation motion data,
the image stabilizing method further includes,
combining the filtered first axis-direction translation motion data and the filtered first axis-direction rotation motion data to generate first motion information, combining the filtered second axis-direction translation motion data and the filtered second axis-direction rotation motion data to generate second motion information, generating the filtered third axis-direction rotation motion data as third motion information, and generating the stabilized image is based at least on the first motion information, the second motion information, and the third motion information.

\* \* \* \* \*